United States Patent
Kapner et al.

(10) Patent No.: US 8,309,906 B2
(45) Date of Patent: Nov. 13, 2012

(54) ABSOLUTE OPTICAL ENCODER WITH LONG RANGE INTENSITY MODULATION ON SCALE

(75) Inventors: Daniel John Kapner, Seattle, WA (US); Michelle Mary Milvich, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 64 days.

(21) Appl. No.: 12/813,438

(22) Filed: Jun. 10, 2010

(65) Prior Publication Data

US 2011/0304482 A1    Dec. 15, 2011

(51) Int. Cl.
*G01D 5/34* (2006.01)
*G01B 11/14* (2006.01)

(52) U.S. Cl. .............. 250/231.16; 250/231.18; 356/617

(58) Field of Classification Search ............ 250/231.13–231.18; 356/614–621
See application file for complete search history.

(56) References Cited

U.S. PATENT DOCUMENTS

| | | | |
|---|---|---|---|
| 3,285,123 A * | 11/1966 | Weyrauch et al. | 356/617 |
| 3,882,482 A | 5/1975 | Green | |
| 3,892,961 A * | 7/1975 | Bachmann | 250/214 PR |
| 4,109,389 A | 8/1978 | Balcom | |
| 4,414,754 A | 11/1983 | Lapeyre | |
| 4,631,519 A | 12/1986 | Johnston | |
| 4,859,845 A | 8/1989 | Sakano | |
| 4,928,008 A | 5/1990 | Huggins | |
| 4,964,727 A | 10/1990 | Huggins | |
| 5,010,655 A | 4/1991 | Rieder | |
| 5,017,771 A | 5/1991 | Bartholomew | |
| 5,104,225 A | 4/1992 | Masreliez | |
| 5,129,725 A | 7/1992 | Ishizuka | |
| 5,218,199 A | 6/1993 | Miller | |
| 5,229,600 A * | 7/1993 | Field, Jr. | 250/214 VT |
| 5,237,391 A | 8/1993 | Huggins | |
| 5,279,044 A | 1/1994 | Bremer | |
| 5,442,166 A | 8/1995 | Hollmann | |
| 5,530,543 A | 6/1996 | Hercher | |
| 5,573,236 A * | 11/1996 | Petocchi et al. | 271/265.02 |
| 5,576,830 A | 11/1996 | O'Brien | |
| 5,773,820 A | 6/1998 | Osajda | |
| 5,886,519 A | 3/1999 | Masreliez | |
| 5,965,879 A | 10/1999 | Leviton | |

(Continued)

OTHER PUBLICATIONS

Dolan, R.P. (ed.), "Hewlett-Packard Journal," Hewlett-Packard Company, Palo Alto, Calif., Sep. 1980, vol. 31, No. 9, <http://www.hparchive.com>, 32 pages.

*Primary Examiner* — John Lee
(74) *Attorney, Agent, or Firm* — Christensen O'Connor Johnson Kindness PLLC

(57) ABSTRACT

An encoder configuration comprises a dual-modulation scale track pattern that provides a first intensity modulation component for producing periodic signals, and a second intensity modulation component for producing a long-range absolute signal. The dual-modulation scale track pattern increases the range-to-resolution ratio of the encoder without the use of additional scale tracks that would increase the width of the encoder components. The long-range signal may be encoded in the dual-modulation scale track pattern either by varying certain dimensions of pattern elements included in the scale track or by superimposing a layer including an optical density variation along on the track on pattern elements of similar areas. In either case, the net offset and/or amplitude levels of the associated signals are modified along the scale track. These modified offset and/or amplitude levels provide the basis for the long-range absolute signal.

18 Claims, 9 Drawing Sheets

U.S. PATENT DOCUMENTS

| | | | |
|---|---|---|---|
| 6,175,109 B1 | 1/2001 | Setbacken | |
| 6,232,594 B1 | 5/2001 | Eccher | |
| 6,271,661 B2 | 8/2001 | Andermo | |
| 6,335,618 B1 | 1/2002 | Nahum | |
| 6,664,535 B1 | 12/2003 | Nahum | |
| 6,707,029 B1 | 3/2004 | Fuwa | |
| 6,867,412 B2 | 3/2005 | Patzwald | |
| 6,888,126 B2 | 5/2005 | Blasing | |
| 6,974,949 B2 * | 12/2005 | Orrico et al. | 250/231.13 |
| 7,186,969 B2 | 3/2007 | Shimomura | |
| 7,253,395 B2 | 8/2007 | Hare | |
| 7,295,324 B2 | 11/2007 | Jones | |
| 7,307,736 B2 | 12/2007 | Tobiason | |
| 7,368,705 B2 | 5/2008 | Hare | |
| 7,608,813 B1 | 10/2009 | Milvich | |
| 2005/0133705 A1 | 6/2005 | Hare | |
| 2010/0328681 A1 * | 12/2010 | Kapner | 356/616 |
| 2011/0273725 A1 * | 11/2011 | Milvich | 356/616 |
| 2011/0304482 A1 * | 12/2011 | Kapner et al. | 341/13 |

* cited by examiner

ABSOLUTE OPTICAL ENCODER WITH LONG RANGE INTENSITY MODULATION ON SCALE

FIELD OF THE INVENTION

The invention relates generally to precision measurement instruments, and more particularly to an absolute optical encoder configuration with a long-range intensity modulation on the scale.

BACKGROUND OF THE INVENTION

Incremental position encoders utilize a scale structure that allows the displacement of a readhead relative to a scale to be determined by accumulating incremental units of displacement, starting from an initial point along the scale. Such encoders are suitable for certain applications, particularly those where line power is available. However, in certain applications, such as those where encoders are used in low power consumption devices, it is more desirable to use absolute position encoders. Absolute position encoders provide a unique output signal, or combination of signals, at each position along a scale. They do not require continuous accumulation of incremental displacements in order to identify a position. Thus, absolute position encoders allow various power conservation schemes. A variety of absolute position encoders are known, using various capacitive, inductive or optical sensing technologies.

One of the most important figures of merit for an absolute encoder is (range/resolution), that is, the maximum allowed absolute measuring range for a device in comparison to its meaningful measurement resolution and/or accuracy. This may be referred to as its "range-to-resolution ratio."

Some encoders achieve a high range-to-resolution ratio by using a number of binary code tracks that run in parallel along a scale. The range of this technique is generally limited by the width of the scale, which determines the number of binary tracks that may be fabricated. Furthermore, crude binary sensing generally limits the resolution. This technique is generally not optimum for narrow scales, which are desirable in a compact encoder. It will be appreciated that the least significant bit (LSB) binary code track may be thought of as a "fine wavelength" incremental track, since it repeats at the "fine" spatial resolution of the LSB and provides only incremental displacement information (that is, it provides only periodic non-absolute signal), unless it is used in combination with tracks that provide more significant code bits. This is characteristic of the fine wavelength tracks that are used in most high-resolution absolute encoders (e.g., those that provide resolution on the order of microns). Thus, the fine wavelength track (fine track) may also be referred to as an incremental track in many absolute encoders.

In comparison to an "all binary" technique, some encoders enhance the resolution of the fine track by using techniques that provide an analog signal related to that wavelength, and then measuring that analog signal to within some fraction of its range, to provide resolution that is finer than the fine wavelength, and thereby extend the range-to-resolution ratio of an absolute encoder. This is typically referred to as signal interpolation, and the ratio of the fine wavelength to the resulting measurement resolution is typically referred to as the interpolation ratio. Depending on the technology used, and the level of expenditure used to provide the precision components and assembly that govern the signal-to-noise (S/N) ratio, practical signal interpolation ratios of up to 100, 300, or even 1000 or more are possible. However, generally speaking, an interpolation ratio greater than approximately 100 may require significant additional expense for the required precision components and assembly.

Some encoders abandon binary tracks and use signal interpolation on an additional scale track that is coarser than the fine track. Such a track may be referred to as an absolute scale track (absolute track). It will be appreciated that such signal interpolation must have resolution and repeatability within plus and minus one half of the fine wavelength, in order to resolve the ambiguity of the periodic signals provided by the fine track. Some encoders use an absolute track that varies monotonically (e.g., linearly) over the entire measurement range. However, assuming a fine track wavelength on the order of 20-100 microns, and an interpolation ratio on the order of 100, such an absolute track alone would bring the associated absolute measuring range up to only 2-10 millimeters, which is of limited utility.

To overcome this limitation, some encoders use at least two additional absolute tracks that have significantly longer spatial wavelengths than the fine track. Their wavelengths may be conveniently referred to as absolute wavelengths and/or medium wavelengths and/or coarse wavelengths, in order to distinguish them from the fine wavelength and/or emphasize their function and their relative spatial wavelength relationships. As one example, using known sensing techniques (e.g., optical sensing techniques), periodic analog signals (e.g., sinusoidal signals or similar processed outputs, or the like) are derived from two medium-wavelength absolute tracks (also referred to as medium tracks) that have slightly different medium wavelengths. According to known relationships, the spatial phase difference between the two analog signals changes by 360 degrees over a distance that is proportional to the product of the medium wavelengths and inversely proportional to the absolute value of their difference. This distance may be referred to as a synthetic wavelength, which is approximately the absolute measurement range of the device if there are no coarser wavelength tracks. The phase difference between the signals from medium tracks can be used in conjunction with the known synthetic wavelengths to provide the absolute position to a coarse resolution. This may be referred to as the coarse position. The coarse position resolution and/or accuracy must be within approximately plus and minus one half of one of the medium wavelengths, in order to resolve the ambiguity of the periodic signal(s) provided by the medium track, in order to reliably identify a particular period of the medium wavelength corresponding to the coarse position. The periodic signal(s) from that medium track may then be interpolated within that particular period of the medium wavelength to provide the absolute position to a medium resolution that is better than the coarse resolution. This may be referred to as the medium position. The medium position resolution and/or accuracy must be within approximately plus and minus one half of one fine wavelength, in order to resolve the ambiguity of the periodic signal(s) provided by the fine track, in order to reliably identify a particular period of the fine wavelength corresponding to the medium position. The periodic signal from the fine track may then be interpolated within that particular period of the fine wavelength to provide the absolute position of a device with the ultimate fine resolution and/or accuracy. The foregoing technique is generally known and additional detail regarding various related encoder configurations and/or signal processing is readily available in various absolute encoder and absolute interferometer patents. The foregoing technique may be referred to as a Synthetic Coarse Wavelength Absolute Measurement Technique (SCWAM technique).

U.S. Pat. Nos. 3,882,482, 5,965,879, 5,279,044, 5,886,519, 5,237,391, 5,442,166, 4,964,727, 4,414,754; 4,109,389; 5,773,820; and 5,010,655, disclose various encoder configurations and/or signal processing techniques relevant to absolute encoders, including those outlined above, and are hereby incorporated herein by reference in their entirety. However, the prior art fails to teach configurations which provide certain combinations of range-to-resolution ratio, high resolution, compact size, robustness, and cost desired by users of absolute encoders. It will be appreciated that extending the range-to-resolution ratio without increasing the width of the scale, detector, and/or other encoder components is particularly difficult. Improved configurations of absolute encoders that provide such combinations would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to improved absolute encoder configurations that provide improved combinations of range-to-resolution ratio, high resolution, longer range, compact size, robustness, and fabrication and assembly cost.

In accordance with one aspect of the present invention, a dual-modulation scale track pattern is configured to provide a first periodic intensity modulation in a resulting detected light pattern and an additional long-range intensity modulation component in the detected light pattern that can be utilized to increase the absolute measuring range of the encoder. Some examples of exemplary scale track patterns that provide a first periodic intensity modulation and that can be modified or adapted to create Dual-Modulation Scale Track patterns (DMST patterns) that provide the additional long-range intensity modulation according to design principles disclosed herein are described in commonly assigned U.S. Pat. No. 7,608,813 (the '813 patent), entitled "Scale Track Configuration For Absolute Optical Encoder," which is hereby incorporated by reference in its entirety. The scale track patterns disclosed in the '813 patent overcome various shortcomings of the prior art and utilize the SCWAM technique to provide good range-to-resolution ratios, as well as other desirable characteristics. In other words, as described above, the '813 patent teaches the use of medium wavelength scale track patterns with slightly different wavelengths that can provide a longer synthetic wavelength. The signals derived from the slightly different wavelengths may be combined into an absolute position measurement signal, which may be used in combination with the known synthetic wavelength to determine an absolute position within the synthetic wavelength. The length of the synthetic wavelength limits the measuring range of the encoder over which the absolute position can be determined. The maximum length of the synthetic wavelength that can be practically achieved using the scale track patterns disclosed in the '813 patent still places a limit on the maximum absolute measuring range of the encoder that is less than desired for a number of applications.

In accordance with the present invention, the maximum absolute measuring range of an encoder may be extended by encoding or superimposing a long-range intensity modulation feature into one or more of the scale track patterns that also provides a shorter range intensity modulation, in order to provide a DMST pattern. In various embodiments, by using a DMST pattern according to principles disclosed herein, the absolute measuring range and or the range-to-resolution ratio of an encoder may be increased without increasing the width of its scale or detector or other encoder components. In one particular specific example embodiment, an encoder with a synthetic wavelength of approximately 25.2 mm (as described in a specific example embodiment in the '813 patent) derived from two scale track patterns that provide respective shorter range intensity modulations (e.g., having wavelengths on the order of 700 microns), may have its absolute measuring range extended to be 70 mm or more by utilizing DMST patterns and related signal processing techniques disclosed herein.

It will be appreciated that in SCWAM technique systems, a "chain-down" process is used to link the coarse, medium and the fine or incremental wavelength measurements together to determine the absolute position over the coarse wavelength range with the resolution provided by the fine wavelength measurement. Briefly, one potential type of error that may occur in the chain-down process, if the range-to-resolution ratio is pushed too far, is an error in determining the correct number of relatively finer wavelengths included in a relatively coarser absolute measurement. Such an error may be referred to as a "wavelength jump." In other words, if a measurement of the spatial phase position within a relatively coarser wavelength (e.g., the synthetic wavelength, or a medium wavelength) is not determined to an appropriate level of accuracy, the chain-down process may link the resulting relatively coarser position estimate to an incorrect particular wavelength or period in the next relatively finer wavelength scale track pattern. If the range-to-resolution ratio is pushed too far (e.g., near the typical design margin) the associated wavelength or period error is typically one wavelength. Then, when the signal processing continues the chain-down process to provide a higher resolution measurement based on the more accurate signals provided by the next relatively-finer wavelength scale track pattern, this one wavelength error persists. Short-range errors, long-range errors, and signal noise may all contribute to such wavelength jumping errors. For a given level of accuracy in encoder component fabrication, assembly, and signal processing (e.g., position interpolation within a particular wavelength), the practical way to prevent such errors is to limit the ratios between the various wavelengths used in the absolute encoder. With the ratios limited, a known method of extending the overall range-to-resolution ratio of an encoder is to add additional scale tracks to provide longer or shorter wavelengths. However, adding additional scale tracks is undesirable from the standpoint of size and complexity.

In contrast to known methods of providing a longer absolute measurement range by adding additional scale tracks, the present invention provides a longer absolute measurement range without adding an additional scale track by providing at least one scale track including a DMST pattern according to principles disclosed herein, which provides a first intensity modulation component that has a first spatial wavelength SW1 and repeats a plurality of times over the measuring range (e.g., producing a medium wavelength signal), and also provides a second intensity modulation component that varies at a slower rate than the first intensity modulation component along the measuring axis direction, and/or that may have a unique value at each point within the measuring range (e.g., producing a long-range absolute measurement signal). The second intensity modulation component is detected in order to provide a more slowly varying signal which functions similarly to the longer spatial wavelength signals provided by additional absolute tracks in prior art designs. The net result is that a higher range-to-resolution ratio is achieved with reasonable interpolation levels and without increasing the overall scale width.

In one embodiment, an absolute optical encoder includes a scale comprising at least a first dual-modulation scale track pattern (DMST pattern) extending along a measuring axis direction, a light source configured to illuminate the scale and the first dual-modulation scale track pattern, and a photo detector arrangement configured to receive light from the first dual-modulation scale track pattern. Each dual-modulation scale track pattern is configured to provide a first intensity modulation component (e.g., producing a medium wavelength signal) in light the photo detector arrangement receives from that dual-modulation scale track pattern. The first intensity modulation component varies as a function of position along the measuring axis direction, and has a first spatial wavelength SW1 along the measuring axis direction. Each dual-modulation scale track pattern is further configured to provide a second intensity modulation component (e.g., producing an additional long-range signal) in the light the photo detector arrangement receives from that dual-modulation scale track pattern, and the second intensity modulation component varies as a function of position along the measuring axis direction. Each dual-modulation scale track pattern is further configured such that the first intensity modulation component repeats along the measuring axis direction a plurality of times over a measuring range of the absolute optical encoder, and the second intensity modulation component varies at a slower rate than the first intensity modulation component along the measuring axis direction. In general, the second intensity modulation component varies such that it defines a unique signal value, or a unique range of signal values, within each individual spatial period of the next-finer absolute wavelength used in the absolute optical encoder. In some embodiments, the next-finer absolute wavelength may be a synthetic wavelength derived from two signals having similar spatial wavelengths corresponding to two similar scale track pattern wavelengths. In other embodiments, the next-finer absolute wavelength may be a scale track pattern wavelength.

In various embodiments, the first intensity modulation component is provided by area variations included in pattern elements included in the first dual-modulation scale track pattern. In one specific example embodiment, the first DMST pattern corresponds to a medium wavelength absolute scale track pattern that is utilized in combination with another medium wavelength absolute scale track pattern according to the SCWAM technique, and the first intensity modulation component corresponds to the medium wavelength signal that it produces. The first intensity modulation component may be provided by pattern elements arranged periodically along the DMST pattern. The second intensity modulation component may be provided by an additional scale track pattern feature that is encoded into or superimposed on those pattern elements according to various techniques disclosed herein, and corresponds to an additional long-range signal produced by the additional scale track pattern feature. In some embodiments, the second intensity modulation component is also provided by area variations included in the pattern elements included in the first dual-modulation scale track pattern. In other embodiments, a layer that provides an optical density variation along the measuring axis direction is superimposed onto the pattern elements, and the optical density variation provides the second intensity modulation component.

As described in the previously incorporated '813 patent, the first intensity modulation component and the resulting medium wavelength signals may be achieved by varying the width of the opaque or reflective pattern elements formed on a transparent substrate (e.g., a chrome on glass scale). In one specific example embodiment, the long-range signal of the present invention may be encoded into or superimposed on the medium wavelength scale track pattern by further varying specific width dimensions of the pattern elements (e.g., the minimum chrome feature and/or the minimum clear feature of the pattern elements along the length of the scale). By varying specific dimensions of the pattern elements such as the minimum chrome feature and/or the minimum clear feature, the overall offset and/or amplitude levels of the periodic medium wavelength signals may be changed as a long-range function of position along the measuring range, and these overall offset and/or amplitude level changes can be measured to provide the long-range signal. This additional long range pattern variation has been experimentally determined to produce acceptably small (e.g., insignificant) errors in the medium wavelength signals, despite being encoded into or superimposed on the pattern variations that produce the medium wavelength signals. The variations of the specific dimensions of the pattern elements such as the minimum chrome feature and/or minimum clear feature along the length of the scale may be implemented according to a desired signal pattern for the long-range signal (e.g., linear, step function, sinusoidal function, etc.).

In various embodiments, a photo detector arrangement used to receive the first and second intensity modulation components provided by a DMST pattern comprises a first set of photo detector elements connected such that a set of signals from the first set of photo detector elements processed according to a first relationship provides a value that is indicative of position of the first set of photo detector elements relative to a period of the spatial wavelength of the first intensity modulation component, and the set of signals from the first set of photo detector elements processed according to a second relationship provides a value that is indicative of the long-range or coarse resolution position of the first set of photo detector elements relative to the second intensity modulation component. In one specific example embodiment the first set of photo detector elements provides a set of signals comprising known quadrature-type signals, which are processed according to the first relationship to provide a position indicating value that repeats periodically along the measuring axis direction. The set of signals comprising known quadrature-type signals may also be processed according to the second relationship to provide a value corresponding to their average DC offset or bias, or their average amplitudes, or the like. In any case, as outlined above and described in greater detail below, the value provided according to the second relationship is responsive to the second intensity modulation component and varies such that it defines a unique signal value, or a unique range of signal values, within each individual spatial period of the next-finer absolute wavelength used in the absolute optical encoder.

It will be appreciated that although the foregoing summary has emphasized embodiments wherein features of the invention are used in combination with scale track patterns described in the '813 patent, such embodiments are exemplary only, and not limiting. More generally, the scale track pattern features and principles disclosed herein may be used to provide a dual-modulation scale track pattern that encodes or superimposes a second long range intensity modulation component according to this invention onto a first shorter-range intensity modulation component, for a variety of different scale track pattern and detector arrangements. In various embodiments, a plurality of absolute scale tracks including at least one dual-modulation scale track pattern configured according to principles disclosed herein may be used to provide an absolute scale pattern, along with corresponding detector portions, and the resulting signals may be used in combination with the additional long-range signal techniques disclosed herein to provide a desired absolute measuring range and/or range-to-resolution ratio. In some such embodiments the absolute scale pattern may have a width less than 3.0 millimeters and still be used to provide an outstanding range-to-resolution ratio for a desired range (e.g., 70 mm or greater range with micron or sub-micron level resolution) in an economical encoder configuration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
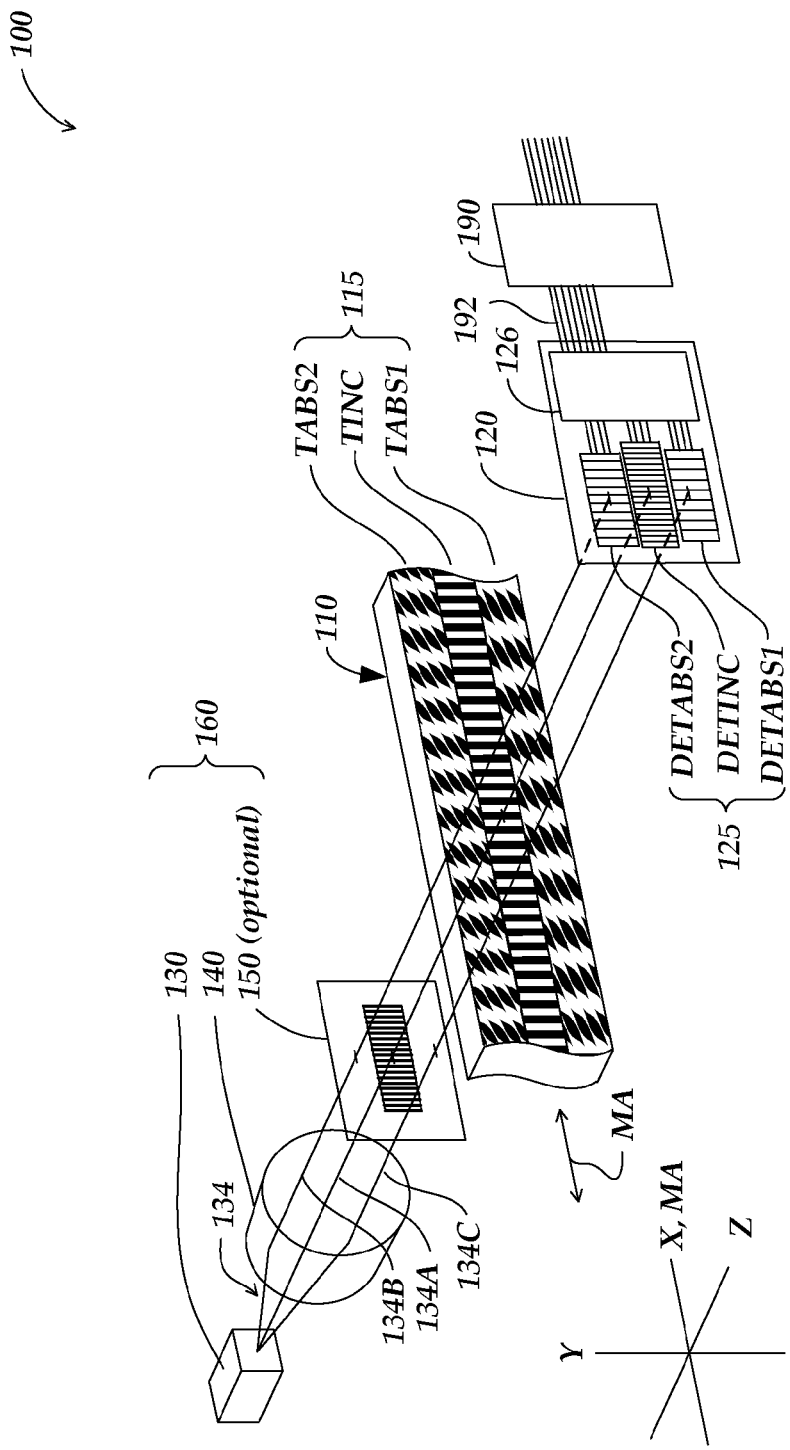
FIG. 1 is an exploded diagram of one embodiment of an absolute optical encoder configuration that may use a dual-modulation scale track pattern (DMST pattern) according to principles disclosed herein.

FIG. 1 is an exploded diagram schematically illustrating one embodiment of an absolute optical encoder configuration 100 that can employ the dual-modulation scale track pattern features and detector configurations disclosed herein. Certain aspects of the encoder configuration 100 are described in more detail in the previously incorporated '813 patent. As shown in FIG. 1, the encoder configuration 100 includes a scale element 110, detector electronics 120 which are connected to signal generating and processing circuitry 190 by power and signal connections 192, and an illumination system or portion 160 comprising a light source 130 for emitting visible or invisible wavelengths of light, a lens 140, and an optional source grating 150. The light source 130 may also be connected to the signal generating and processing circuitry 190 by power and signal connections (not shown). The scale element 110 includes an absolute scale pattern 115 including three scale track patterns—an incremental track pattern TINC, a first medium wavelength DMST pattern TABS1, and a second medium wavelength DMST pattern TABS2. The track patterns TABS1 and TABS2 are usable according to the SCWAM technique outlined previously, and may also be DMST patterns, as described in greater detail below. In one specific exemplary embodiment, the track patterns TABS1 and TABS2 may be configured and operated in a manner analogous to that described below with reference to FIG. 6.

FIG. 1 also shows orthogonal X, Y, and Z directions, according to a convention used herein. The X and Y directions are parallel to the plane of the absolute scale pattern 115, with the X direction parallel to the intended measuring axis direction MA (e.g., perpendicular to elongated grating pattern elements that may be included in the incremental track pattern TINC). The Z direction is normal to the plane of the absolute scale pattern 115.

The detector electronics 120 includes a detector configuration 125 comprising three detector tracks DETINC, DET1 and DET2 arranged to receive light from the three scale track patterns TINC, TABS1 and TABS2, respectively. The detector electronics 120 may also include signal processing circuitry 126 (e.g., signal offset and/or gain adjustments, signal amplifying and combining circuits, etc.). In one embodiment, the detector electronics 120 may be fabricated as a single CMOS IC. As described in greater detail below, the scale track pattern features and detector configurations disclosed herein for extending the range-to-resolution ratio of an encoder may be adapted for use with any or all of the three scale track patterns and corresponding detector tracks TINC/DETINC, TABS1/DET1, and/or TABS2/DET2.

In operation, light 134 emitted from the light source 130 may be partially or fully collimated by the lens 140, over a beam area sufficient to illuminate the detected portions of the three scale track patterns. FIG. 1 schematically shows three light paths 134A, 134B, and 134C, of the light 134. Light path 134A is a representative central path including light that illuminates the scale track pattern TINC. When the scale track pattern TINC is illuminated, it outputs a spatially modulated light pattern (e.g., interference fringe light from diffracted orders, in some embodiments) to the detector track DETINC of the detector electronics 120. Light paths 134B and 134C are representative paths including light that illuminates the scale track patterns TABS2 and TABS1, respectively. When the scale track patterns TABS2 and TABS1 are illuminated, they output spatially modulated light patterns (e.g., patterned light corresponding to their patterns) to the detector tracks DETABS2 and DETABS1, respectively, of the detector electronics 120. In various embodiments, the encoder configuration 100 may be configured such the track patterns TABS2 and TABS1 produce a shadow image (e.g., a blurred or unblurred shadow image) projected onto the detector tracks DETABS2 and DETABS1, respectively, as described in greater detail below with reference to FIGS. 2-5. It will be appreciated that all spatially modulated light patterns move in tandem with the scale 110. In each of the detector tracks DETINC, DETABS1, and DETABS2 individual photodetector areas are arranged to spatially filter their respective received spatially modulated light pattern to provide desirable position indicating signals (e.g., quadrature signals, or other periodic signals having a spatial phase relationship that is conducive to signal interpolation). One embodiment of the detector tracks DETINC, DETABS1, and DETABS2 is described in greater detail below with reference to FIG. 2. In some embodiments, rather than individual photodetector areas, a spatial filter mask with individual apertures may mask relatively larger photodetectors to provide light receiving areas analogous to the individual photodetector areas illustrated, to provide a similar overall signal effect according to known techniques.

In some moderate resolution embodiments (e.g., with fine track wavelengths on the order of 40 microns, or more), the encoder configuration 100 may be configured such that the track pattern TINC produces a shadow image projected onto the detector track DETINC. In relatively higher resolution embodiments, the track pattern TINC is generally configured to produce diffracted light. In some embodiments, for example those having a fine track wavelength of approximately 8 microns or less, the encoder configuration 100 may be configured according to known methods such that diffracted orders (e.g., +/1 first orders) produce interference fringes that reach the detector track DETINC, according to known methods. In such embodiments, the source grating 150 is generally omitted. In other embodiments, for example those having a fine track wavelength of approximately 8-40 microns, the encoder configuration 100 may be configured according to known methods such that several diffracted orders interact to produce a self image (e.g., a Talbot image or a Fresnel image) at the plane of the detector track DETINC. In self-imaging configurations the light source 130 may be an LED. The source grating 150 may be omitted, or optional, in some embodiments where the light source dimensions are small enough. However, when using an extended source the source grating 150 may be needed in order to provide the most desirable self imaging. In such a case, the light surrounding the representative light path 134A passes through the grating structure of the source grating 150 to provide an array of partially coherent illumination sources at the grating openings, which are arranged with a pitch approximately matching the pitch or wavelength of the track pattern TINC, to illuminate the scale track pattern TINC according to known self-imaging illumination principles. FIG. 1 shows an embodiment of the source grating 150 that allows the representative light paths 134B and 134C to pass through a transparent substrate of the source grating 150, so that their intensity and degree of collimation, which contributes to the quality of the signals from the detector tracks DETABS1 and DETABS2, is not disrupted by the grating structure of the source grating 150. In other embodiments, the representative light paths 134B and 134C may also pass through a grating structure on the source grating 150, however, this is not the optimum configuration.

In various applications, the detector electronics 120 and illumination system 160 are mounted in a fixed relationship relative to one another, e.g., in a readhead or gauge housing (not shown), and are positioned or guided at a generally stable distance from the scale 110, according to known techniques (e.g., by using a bearing system). The scale may be attached to a moving stage, or a gauge spindle, or the like, in various applications. The configuration shown in FIG. 1 is a transmissive configuration. The scale pattern 115 comprises light blocking portions and light transmitting portions (e.g., fabricated on a transparent substrate using known thin-film patterning techniques, or the like) that output the spatially modulated light patterns to the detector tracks by transmission. It will be appreciated that similar components may be arranged in reflective embodiments, wherein the illumination system 160 and the detector electronics are arranged on the same side of the scale 110, and positioned for angled illumination and reflection, if necessary, according to known techniques. The optical encoder configuration 100 may be further understood by reference to similar embodiments disclosed in the '813 patent.

Figure 6:
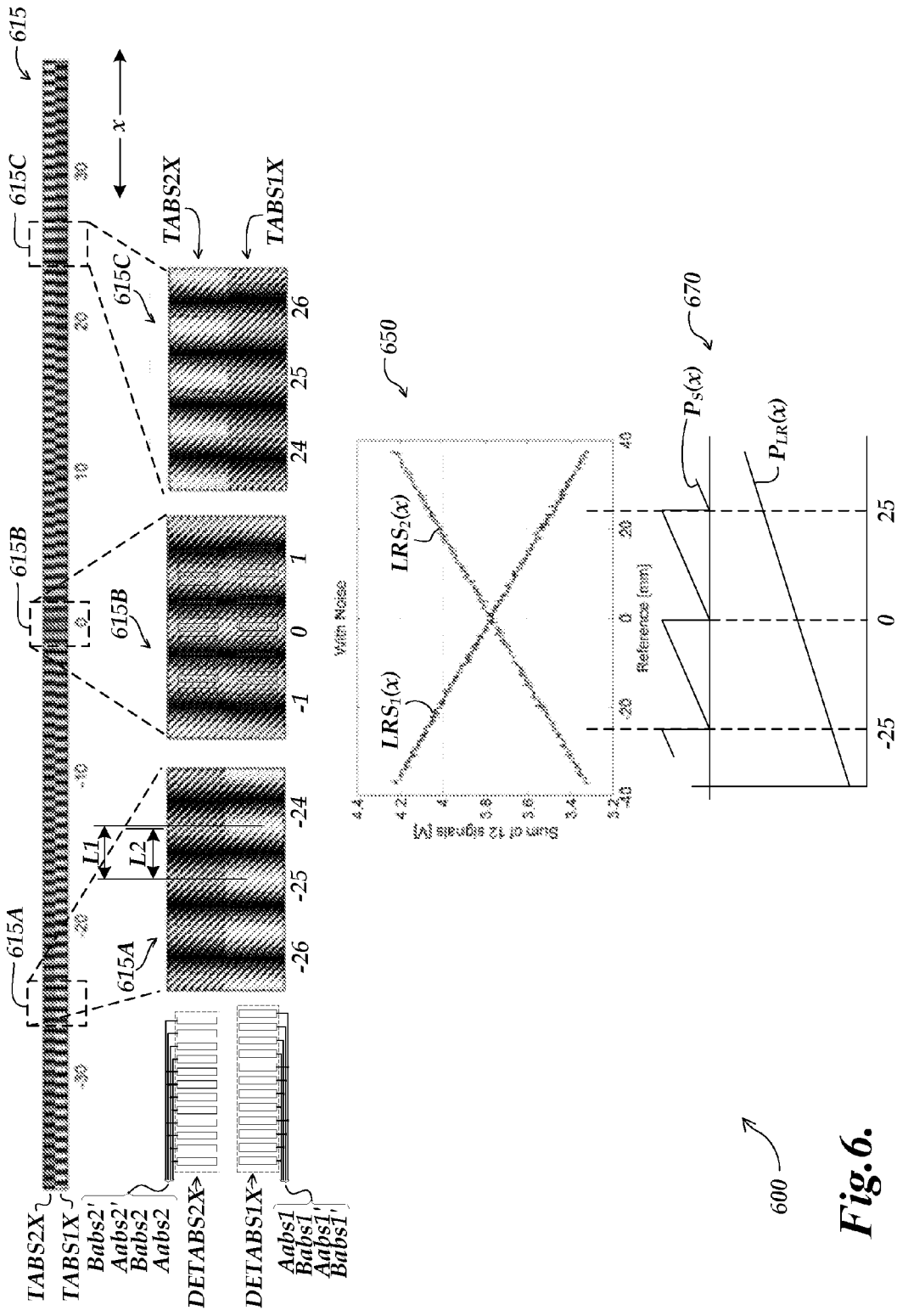
FIG. 6 is a diagram comprising two medium wavelength DMST patterns that may be used with the SCWAM technique, as well as being configured to provide a long-range absolute measurement signal that varies linearly over a measurement range.

It will be appreciated that for the purposes of this disclosure, the sequence of the scale tracks along the Y axis direction in FIG. 1 is exemplary only, and not limiting. For example, in other embodiments, the absolute track patterns TABS1 and TABS2 may be arranged adjacent to one another (e.g., FIG. 6 shows an arrangement usable in such an embodiment) with the fine track pattern TINC located to one side of them, provided that the detector tracks (and the source grating 150, if included) are arranged along the proper corresponding light paths according to the teachings outlined above.

Figure 2:
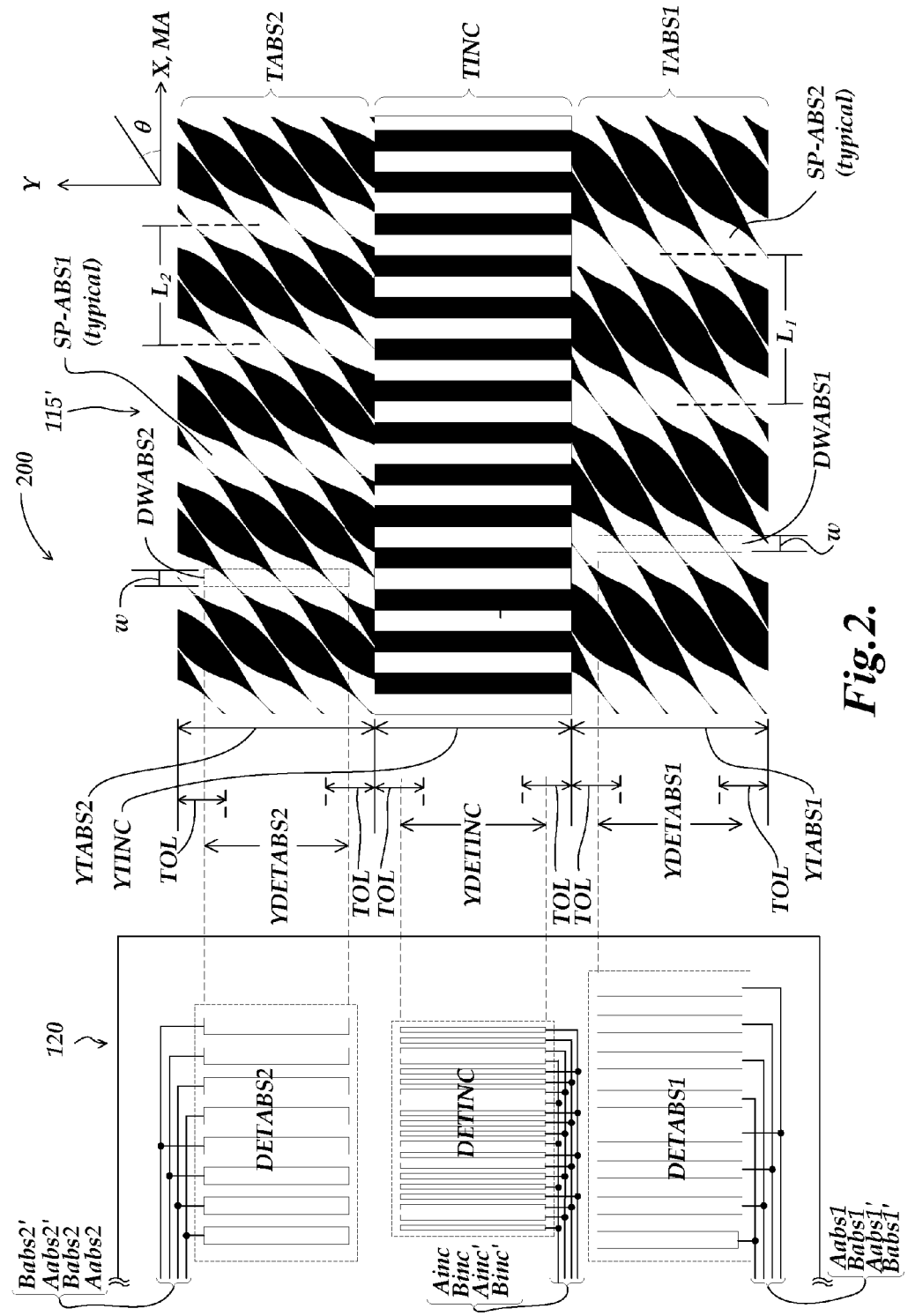
FIG. 2 is a diagram showing various geometric relationships which may be advantageous in some embodiments of a detector and absolute scale pattern configuration usable in the absolute optical encoder configuration of FIG. 1, and showing two exemplary medium wavelength scale track patterns that may be used with the SCWAM technique as well as being included in DMST patterns according to principles disclosed herein.

FIG. 2 is a diagram 200 showing various geometric relationships which may be advantageous in some embodiments of a detector and absolute scale pattern configuration usable in the absolute optical encoder configuration 100 of FIG. 1, and showing two exemplary medium wavelength scale track patterns TABS1 and TABS2 that may be used with the SCWAM technique and may also be DMST patterns as described in greater detail below. As shown in FIG. 2, a representative segment of an absolute scale pattern 115' includes a fine track pattern TINC, the first medium wavelength absolute scale track pattern TABS1 having a spatial wavelength L1, and the second medium wavelength absolute scale track pattern TABS2 having a spatial wavelength L2. Briefly, the medium track patterns TABS1 and TABS2 include signal varying portions SP (also referred to as pattern elements SP) which transmit (or reflect) a light pattern that is a spatially modulated intensity pattern approximately corresponding to their geometry. In the embodiment shown in FIG. 2, each signal varying portion SP is shaped based on a Y direction "cross section" dimension that varies as a sinusoidal function of "x," that is, as a function of position along the X direction and/or measuring axis MA of the scale pattern 115', as described in greater detail below with reference to FIGS. 3, 4, and 5.

The spatially modulated light pattern of each track pattern TINC, TABS1 and TAB2 is nominally aligned to be centered over the corresponding detector track DETINC, DETABS1, and DETABS2, respectively (e.g., based on an overall encoder configuration such as that described with reference to FIG. 1). According to one advantageous feature, the detectors of the absolute detector tracks DETABS1 and DETABS2 are configured to sense spatially modulated light over respective Y direction detector edge-to-edge dimensions YDETABS1 and YDETABS2, respectively, which are less than the corresponding Y direction scale track pattern dimensions YTABS1 and YTABS2. This allows for misalignment tolerance zones or sub-tracks TOL, which extend along the measuring axis MA on each side of a center or nominal alignment center sub-track, as described in greater detail below with reference to FIG. 3. For reference, and for purposes of explanation, FIG. 2 schematically illustrates representative detector window areas DWABS1 and DWABS2, which are shown aligned with the center sub-track of the medium wavelength absolute track patterns TABS1 and TABS2, respectively. Detector window areas DWABS1 and DWABS2 correspond to the detection areas of individual detector elements of the detector tracks DETABS1 and DETABS2, respectively, and are illustrated in a position corresponding to a nominal operational alignment.

In the embodiment shown in FIG. 2, each of the detector tracks DETINC, DETABS1, and DETABS2 comprises an array of individual detector elements arranged and connected in a known quadrature-type detector layout. Briefly, in each array four adjacent detector elements are evenly spaced to provide spatial filtering that detects four spatial phases (i.e., 0, 90, 180, and 270 degrees) of the spatially modulated light pattern that they receive. A plurality of groups of four such adjacent detector elements may be provided, and the detectors that detect the same spatial phase may be interconnected to sum their signal contributions, as illustrated in FIG. 2. The summed signal contributions are shown as comprising signals with either A or B, or A' or B' designations (e.g., the designations corresponding to spatial phase relationships of 0, 90, 180, and 270 degrees, respectively). More specifically, the four quadrature signals corresponding to the incremental detector track DETINC are the signals Ainc, Binc, Ainc', and Binc'. Similarly, the summed signal contributions for the quadrature signals for the detector track DETABS1 are signals Aabs1, Babs1, Aabs1', and Babs1', while the summed signal contributions for the quadrature signals for the detector track DETABS2 are signals Babs2', Aabs2', Babs2, and Aabs2. Thus, sinusoidal quadrature signals are provided as a function of position, as each spatially modulated light pattern moves over its corresponding detector track and the detector elements spatially filter the spatially modulated light pattern as outlined above. The quadrature signals may be processed to determine the spatial phase position of each detector track within a current local wavelength of its corresponding scale track, according to known techniques. In particular, when one or each of the medium wavelength absolute track patterns TABS1 and/or TABS2 is a DMST pattern including features that provide a spatially modulated light pattern having first periodic intensity modulation component according to principles disclosed herein (e.g., as described below with reference to FIGS. 3-5), then the spatial filtering provided by the corresponding one or each of the detector tracks DETABS1 and DETABS2 provides signals corresponding to four spatial phases (i.e., 0, 90, 180, and 270 degrees) of that first periodic intensity modulation component. These determined spatial phase positions (in particular, the spatial phase positions within the medium wavelength absolute track patterns TABS1 and TABS2) may be processed according to the previously outlined SCWAM technique, in order to determine an absolute position within a synthetic wavelength SW, where SW=L1*L2/|L1−L2|. In addition, when at least one of the medium wavelength absolute track patterns TABS1 and TABS2 is a DMST pattern including features that provide a second intensity modulation component according to principles disclosed herein (e.g., as described below with reference to FIGS. 3-5), the quadrature signals may also be processed to provide a combined signal that depends on the second intensity modulation component and indicates an absolute position over a measurement range that is longer than the synthetic wavelength SW (e.g., as described below with reference to FIGS. 6-9).

In some embodiments, the overall width of the scale pattern 115' may be approximately 3.0 millimeters or less, the dimensions YTINC, YTABS1, and YTABS2 may each be approximately 1.0 millimeter or less, and the dimensions YDETINC, YDETABS1, and YDETABS2 may each be less than the corresponding dimensions YTINC, YTABS1, and YTABS2, respectively. In one specific example embodiment, the dimensions YTINC, YTABS1, and YTABS2 may each be 0.8 millimeters, the dimensions YDETINC, YDETABS1, and YDETABS2 may each be 0.508 millimeters, and the various sub-tracks TOL may extend by an amount of approximately 0.146 millimeters along the Y direction beyond the dimensions YDETINC, YDETABS1, and YDETABS2, to allow for both misalignment and to prevent blurred spatially modulated light from bleeding onto the detectors of an adjacent track. Such compact dimensions are particularly advantageous in a number of applications (e.g., linear gauges and the like), both in relation to size and in relation to cost. Various other design considerations related to certain features and dimensions shown in FIG. 2 may be understood based on a description of similar features and dimension in the incorporated '813 patent.

The wavelength L2 of DMST pattern TABS2 may be L2=720 microns and wavelength L1 of DMST pattern TABS1 may be L1=700 microns. The wavelength of the fine track pattern TINC may be 20 microns. Using the SCWAM technique, this provides a synthetic wavelength of approximately 25.2 mm, and allows reasonable interpolation ratios and wavelength relationship ratios to be used in an absolute encoder. As will be described in more detail below with reference to FIG. 6, in one specific example embodiment, the synthetic wavelength of 25.2 mm may be used in conjunction with long-range signals associated with the second intensity modulation component of the DMST pattern (e.g., as provided by the medium wavelength absolute track patterns TABS1 and TABS2, in various embodiments) such that an absolute measuring range of at least 70 mm or more may be economically provided.

Of course the configuration and dimensions outlined in the example above are exemplary only, and not limiting. For example, various Y direction dimensions may be increased to provide larger signals and/or wider tolerance sub-tracks, and/or additional space to prevent blurred light from bleeding from one track to another, or additional absolute tracks may be provided to increase the absolute measuring range (e.g., using the SCWAM technique with additional absolute tracks having longer wavelengths and/or DMST pattern features).

Figure 3:
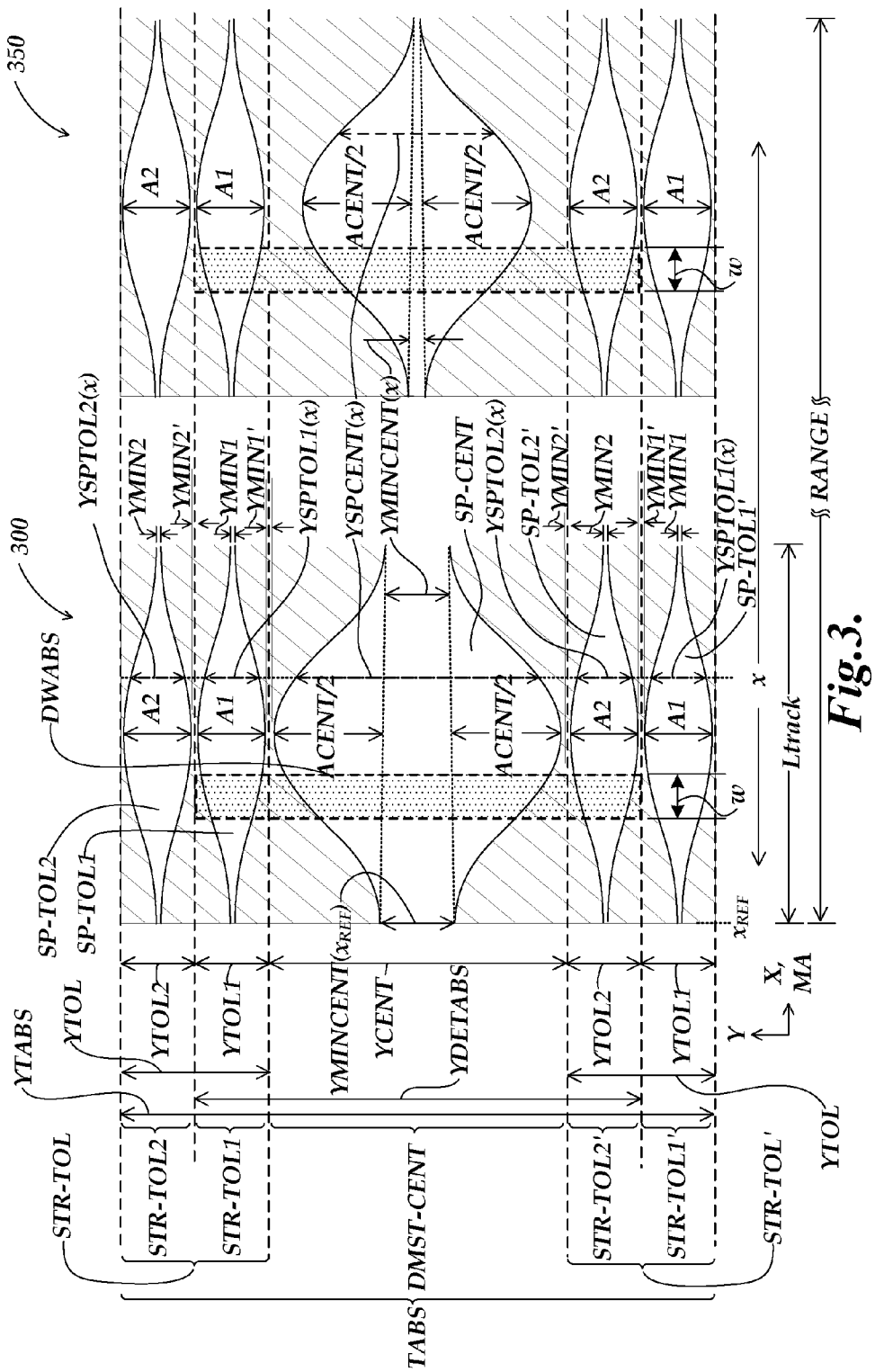
FIG. 3 is a diagram of two portions of a first example of a DMST pattern according to principles disclosed herein.

FIG. 3 is a diagram of two portions 300 and 350 of a first example of a DMST pattern TABS according to principles disclosed herein. The DMST pattern TABS may be adapted to be used in place of a variety of DMST track patterns disclosed herein. As shown in FIG. 3, the portion 300 may be regarded as a representative segment (one wavelength Ltrack in length) provided near a first end of the DMST pattern TABS (e.g., near a first end of the absolute measuring range of an encoder) and the portion 350 may be regarded as a representative segment (one wavelength Ltrack in length) provided near a second end of the DMST pattern TABS (e.g., near the second end of absolute measuring range of the encoder). In the embodiment shown in FIG. 3, the primary difference between the portions 300 and 350 is reflected in the long-range variation in the dimension YMINCENT(x), which determines the long-range variation in the dimension YSPCENT(x). The variation in the dimension YSPCENT(x) is configured such that it provides both a first periodic intensity modulation component and a second long-range intensity modulation component in the spatially modulated light pattern provided by DMST pattern TABS, as described in greater detail below.

The DMST pattern TABS includes a central sub-track DMST-CENT having a respective Y direction dimension YCENT, and misalignment tolerance sub-tracks STR-TOL1, STR-TOL2, STR-TOL1', and STR-TOL2', having respective Y direction dimensions Y-TOL1, Y-TOL2, Y-TOL1, and Y-TOL2. Together, the sub-tracks STR-TOL1 and STR-TOL2 makeup the overall tolerance sub-track STR-TOL, and the sub-tracks STR-TOL1' and STR-TOL2' makeup the overall tolerance sub-track STR-TOL'. It will be understood that each sub-track continues along the direction of the measuring axis MA.

For purposes of explanation, FIG. 3 also shows a nominally aligned representative detector window area DWABS, which corresponds to the detection area of an individual detector element that would be used as a spatial filter to sense the spatially modulated light provided by the track pattern TABS. In an encoder application, YTOL2 is the amount of misalignment tolerance allowed along a first Y direction between the detector window area DWABS (and/or the corresponding detector track) and the DMST pattern TABS, and YTOL1 is the amount of misalignment tolerance allowed along the opposite Y direction. The central sub-track DMST-CENT is dimensioned having a respective Y direction dimension YCENT, such that even if a detector window area DWABS is misaligned to limits of the tolerance sub-tracks STR-TOL2 or STR-TOL1', approximately all the light from the pattern portion(s) SP-CENT always falls on the detector window area DWABS. Thus, the resulting signal contributions from SP-CENT carry the information corresponding to both the first periodic intensity modulation component and the second long-range intensity modulation component with good fidelity, regardless of misalignment.

Various design considerations related to the tolerance sub-tracks STR-TOL and STR-TOL' and their included pattern portions may be understood based on a description of similar features and dimension in the incorporated '813 patent, and need not be described in detail here. Briefly, the variable dimensions YSPTOL2($x$) and YSPTOL1($x$) that define the shape of the signal varying pattern portions SP-TOL2 and SP-TOL1, respectively, may be defined as follows:

$$YSPTOL2(x) = YMIN2 + \left[(A2 - YMIN2) * \sin\left(\frac{2\pi}{Ltrack}(x - xref)\right)\right] \quad \text{(Eq. 1)}$$

$$YSPTOL1(x) = YMIN1 + \left[(A1 - YMIN1) * \sin\left(\frac{2\pi}{Ltrack}(x - xref)\right)\right] \quad \text{(Eq. 2)}$$

As shown in FIG. 3, if a detector window area DWABS is misaligned along the Y direction the DMST pattern TABS is configured such that the light "lost" from the detector window area DWABS in the sub-track STR-TOL is always compensated by light "gained" for the detector window area DWABS in the sub-track STR-TOL', and vice-versa. Thus, the resulting combined signal contributions from the sub-tracks STR-TOL and STR-TOL' correspond to the sinusoidal shape of their pattern portions SP-TOL' with sinusoidal fidelity, regardless of misalignment. This is accomplished if the tolerance sub-tracks STR-TOL and STR-TOL' are geometrically congruent and coincide when one is translated along the Y direction by a distance of YDETABS, as taught in greater detail in the '813 patent.

As previously outlined, the long-range variation in the dimension YMINCENT(x) determines the long-range variation in the dimension YSPCENT(x). The variation in the dimension YSPCENT(x) is configured such that it provides both the first periodic intensity modulation component and the second long-range intensity modulation component in the spatially modulated light pattern provided by DMST pattern TABS. In particular, in the specific example embodiment shown in FIG. 3, the signal varying pattern portion SP-CENT is shaped according to the varying Y direction dimension YSPCENT(x) such that it comprises a sinusoidally varying area portion having a maximum Y direction dimension or amplitude ACENT, and long-range varying area portion characterized by the variable dimension YMINCENT(x). Ltrack is the nominal wavelength of the DMST pattern TABS (e.g., a medium wavelength), and also the wavelength of the first periodic intensity modulation component. The variable dimension YSPCENT(x) that defines the shape of the signal varying pattern portion SP-CENT may be defined as follows:

$$YSPCENT(x) = \quad \text{(Eq. 3)}$$
$$YMINCENT(x) + \left[(ACENT) * \sin\left(\frac{2\pi}{Ltrack}(x - x_{ref})\right)\right]$$

where $$YMINCENT(x) = YMINCENT(x_{ref}) * \left[1 - k\frac{x}{RANGE}\right] \quad \text{(Eq. 4)}$$

In general, YMINCENT($x_{ref}$) is chosen in relation to ACENT, in order to provide a desired allocation of signal strength between the first and second intensity modulation components, and k is a factor chosen in the range 0<k<1 to provide a desired amount of variation over the measuring range in the long-range absolute measurement signal provided by the second intensity modulation component.

It should be appreciated that the pattern area variation governed by the term YMINCENT(x) provides the second long-range intensity modulation component in the spatially modulated light pattern provided by DMST pattern TABS, and the pattern area variation governed by the remaining sinusoidal term in EQUATION 3 provides the first periodic intensity modulation component. The rate of change or the pattern area variation governed by the term YMINCENT(x) is greatly exaggerated in FIG. 3, for purposes of illustration. In practice, the dimension RANGE may be several times the wavelength Ltrack (e.g., 20-25 times Ltrack in some embodiments, or 100-300 times Ltrack, or more, in other embodiments). Signal processing related to deriving two different signals related to the first and second intensity modulation components, respectively, is described in greater detail below with reference to FIG. 6.

Figure 4:
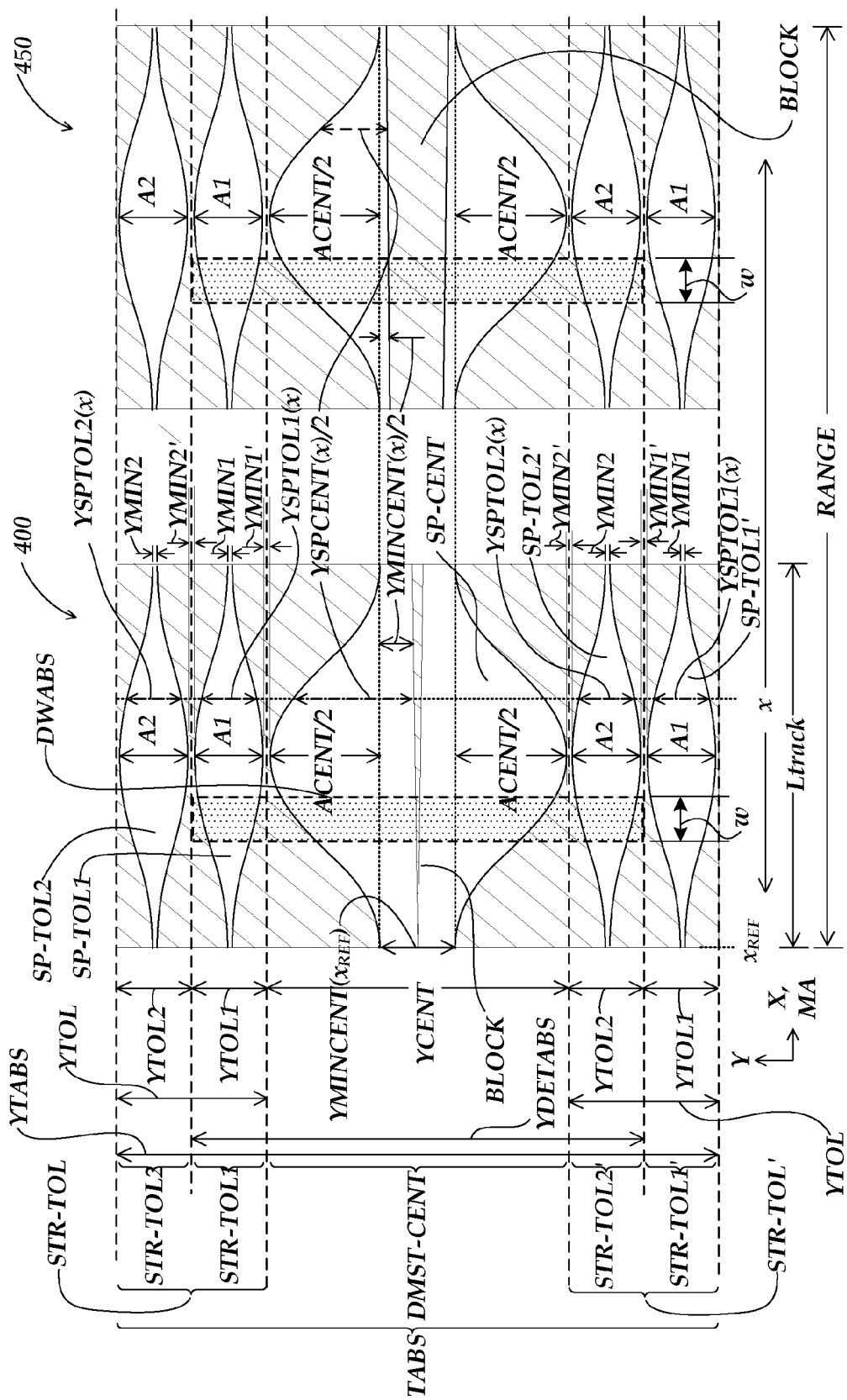
FIG. 4 is a diagram of two portions of a second example of a DMST pattern according to principles disclosed herein.

FIG. 4 is a diagram of two portions 400 and 450 of a second example of a DMST pattern TABS according to principles disclosed herein. The DMST pattern TABS may be adapted to be used in place of a variety of DMST track patterns disclosed herein. The diagrams 400 and 450 of FIG. 4 share certain features and dimension lines with the corresponding diagrams 300 and 350 of FIG. 3. Therefore, only the significant differences in comparison to the configuration of FIG. 3 will be emphasized below. Features which have analogous design considerations and/or analogous functions in FIGS. 3 and 4 are similarly labeled or numbered (e.g., with the same reference label or number, or with one or more prime symbols added), and may be understood by analogy.

As shown in FIG. 4, the portion 400 may be regarded as a representative segment provided in the DMST pattern TABS near a first end of the absolute measuring range of an encoder and the portion 450 may be regarded as a representative segment provided in the DMST pattern TABS near the second end of the absolute measuring range of the encoder. In the embodiment shown in FIG. 4, the primary difference between the portions 400 and 450 is reflected in the long-range variation in the dimension YMINCENT(x), which is affected by the shape of a blocking element BLOCK, and which determines the long-range variation in the dimension YSPCENT (x). The variation in the dimension YSPCENT(x) is configured such that it provides both a first periodic intensity modulation component and a second long-range intensity modulation component in the spatially modulated light pattern provided by DMST pattern TABS, as described in greater detail below.

In particular, in the specific example embodiment shown in FIG. 4, the signal varying pattern portion SP-CENT is shaped according to the varying Y direction dimension YSPCENT(x) such that it comprises a sinusoidally varying area portion having a maximum Y direction dimension or amplitude ACENT, and long-range varying area portion characterized by the variable dimension YMINCENT(x). Ltrack is the nominal wavelength of the DMST pattern TABS (e.g., a medium wavelength), and also the wavelength of the first periodic intensity modulation component. With the addition of the blocking element BLOCK, and the dimension definitions shown in FIG. 4 (which are slightly modified, compared to those shown in FIG. 3, due to the blocking element BLOCK), the variable dimension YSPCENT(x) that defines the shape of the signal varying pattern portion SP-CENT may again be characterized and understood based on the EQUATIONS 3 and 4, and their related description as presented above with reference to FIG. 3.

Figure 5:
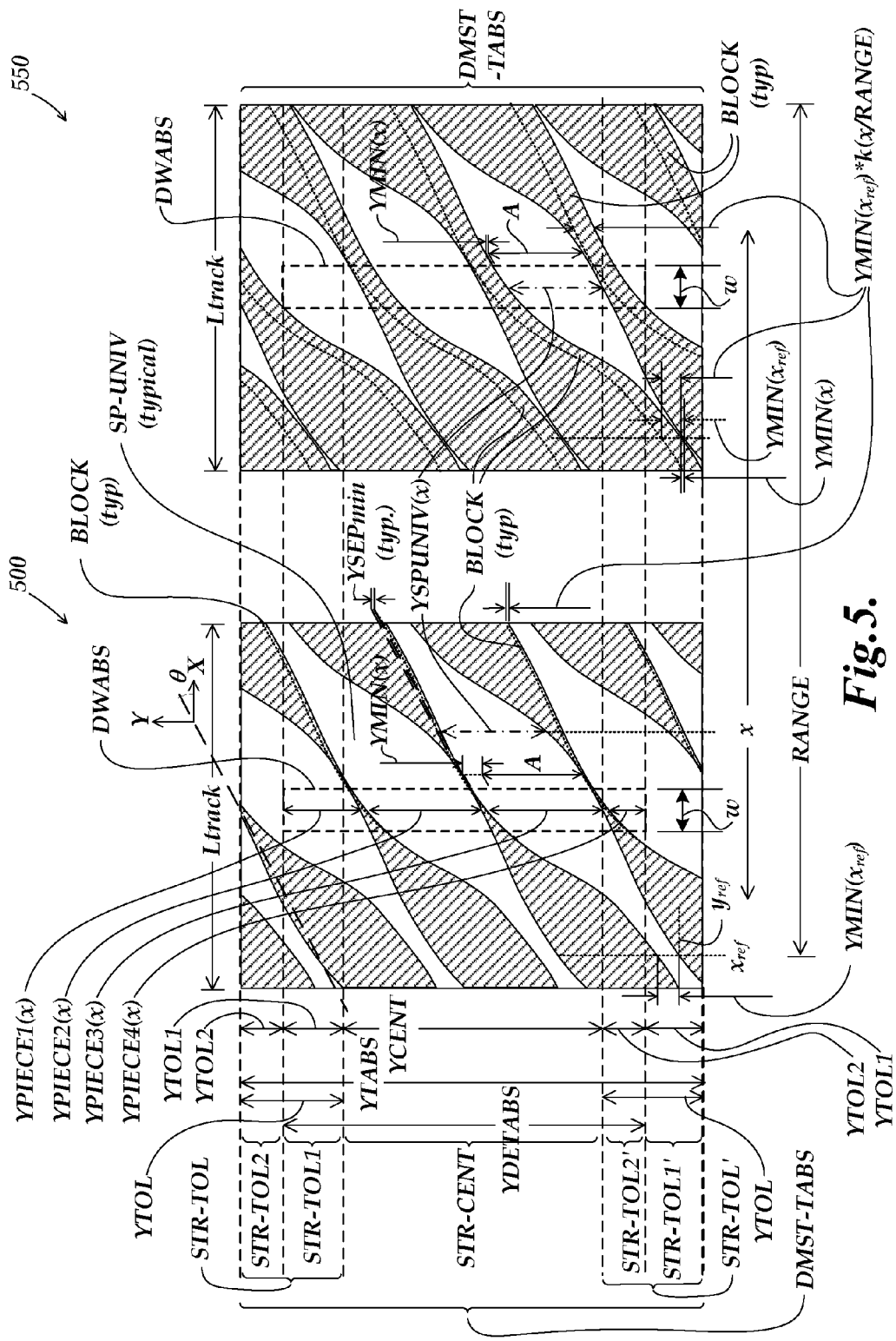
FIG. 5 is a diagram of two portions of a third example of a DMST pattern according to principles disclosed herein, incorporating scale pattern elements similar to those shown in FIG. 2.

FIG. 5 is a diagram of two portions 500 and 550 of a third example of a DMST pattern DMST-TABS according to principles disclosed herein. The DMST pattern DMST-TABS may be adapted to be used in place of a variety of DMST track patterns disclosed herein. The diagrams 500 and 550 of FIG. 5 share certain features and dimension lines with the corresponding diagrams 400 and 450 of FIG. 4 and the corresponding diagrams 300 and 350 of FIG. 4. Therefore, only the significant differences in comparison to the configuration of FIG. 5 will be emphasized below. Features which have analogous design considerations and/or analogous functions in FIGS. 3, 4, and 5 are similarly labeled or numbered (e.g., with the same reference label or number, or with one or more prime symbols added), and may be understood by analogy. As shown in FIG. 5, the portion 500 may be regarded as a representative segment provided in the DMST pattern DMST-TABS near a first end of the absolute measuring range of an encoder and the portion 550 may be regarded as a representative segment provided in the DMST pattern DMST-TABS near the second end of the absolute measuring range of the encoder. In the embodiment shown in FIG. 5, the primary difference between the portions 500 and 550 is reflected in the long-range variation in the dimension YMIN(x), which is affected by the shape of a blocking element BLOCK, and which determines the long-range variation in the dimension YSPUNIV(x). The variation in the dimension YSPUNIV(x) is configured such that it provides both a first periodic intensity modulation component and a second long-range intensity modulation component in the spatially modulated light pattern provided by DMST pattern DMST-TABS, as described in greater detail below.

Similar to the track patterns shown in FIG. 2, although in contrast to the track patterns shown in FIGS. 3 and 4, the track pattern DMST-TABS comprises a single type or shape of patterned signal varying portion SP-UNIV (also referred to as a signal varying element) that is repeated along two directions. The basic patterned signal varying element SP-UNIV is repeated along the Y direction through a central sub-track STR-CENT and through the overall tolerance sub-tracks STR-TOL and STR-TOL' (analogous to those previously described), with the same nominal dimensions in each repetition along the Y direction. It is also repeated along the X direction, or more specifically along a pattern angle θ relative to the X direction, with minor adjustments to the basic patterned signal varying element SP-UNIV as a function of the location x along the measuring axis direction, in order to provide a long-range intensity modulation component, as described in greater detail below.

Various design considerations related to the tolerance sub-tracks STR-TOL and STR-TOL' and the basic patterned signal varying portion SP-UNIV may be understood based on a description of similar features and dimension in the incorporated '813 patent, and need not be described in detail here. Briefly, the dimension YDETABS of the detector window area DWABS and the Y direction repetition dimension of the basic patterned signal varying portion SP-UNIV are chosen such that the dimension YDETABS spans an integer number of the patterned signal varying elements SP-UNIV (e.g., three elements in FIG. 5), and the tolerance sub-tracks STR-TOL and STR-TOL' are geometrically congruent and coincide when one is translated along the Y direction by a distance of YDETABS, as taught in greater detail in the '813 patent. Thus, as shown in FIG. 5, if a detector window area DWABS is misaligned along the Y direction, the DMST pattern DMST-TABS is configured such that the light "lost" from the detector window area DWABS in the sub-track STR-TOL is always compensated by light "gained" for the detector window area DWABS in the sub-track STR-TOL', and vice-versa. Thus, the resulting combined signal contributions from all of the basic patterned signal varying portions SP-UNIV detected by the detector window area DWABS correspond to their shape as a function of x, with good fidelity, regardless of misalignment.

As previously outlined, the long-range variation in the dimension YMIN(x) determines the long-range variation in the dimension YSPUNIV(x). The variation in the dimension YSPUNIV(x) is configured such that it provides both the first periodic intensity modulation component and the second long-range intensity modulation component in the spatially modulated light pattern provided by DMST pattern DMST-TABS. In particular, in the specific example embodiment shown in FIG. 5, the signal varying pattern portion SP-UNIV is shaped according to the varying Y direction dimension YSPUNIV(x) such that it comprises a sinusoidally varying area portion having a maximum Y direction dimension or amplitude A, and long-range varying area portion characterized by the variable dimension YMIN(x). Ltrack is the nominal wavelength of the DMST pattern DMST-TABS (e.g., a medium wavelength), and also the wavelength of the first periodic intensity modulation component. The blocking element BLOCK has a Y direction dimension YBLOCK(x) that varies as a function of x, given by:

$$YBLOCK(x) = YMIN(xref) * k \frac{x}{RANGE} \quad \text{(Eq. 5)}$$

The variable dimension YSPUNIV(x) is analogous to the variable dimension YSPCENT(x) previously described in relation to EQUATIONS 3 and 4. The variable dimension YSPUNIV(x) that defines the shape of the signal varying pattern portions SP-UNIV may be defined as follows:

$$YSPUNIV(x) = YMIN(x) + \left[(A) * \sin\left(\frac{2\pi}{Ltrack}(x - xref)\right)\right] \quad \text{(Eq. 6)}$$

where $$YMIN(x) = \quad \text{(Eq. 7)}$$
$$YMIN(xref) - YBLOCK(x) = YMIN(xref) * \left[1 - k\frac{x}{RANGE}\right]$$

In general, YMIN(xref) is chosen in relation to A, in order to provide a desired allocation of signal strength between the first and second intensity modulation components, and k is a factor chosen in the range 0<k<1 to provide a desired amount of variation over the measuring range in the long-range absolute measurement signal provided by the second intensity modulation component.

It should be appreciated that the pattern area variation governed by the term YMIN(x) provides the second long-range intensity modulation component in the spatially modulated light pattern provided by DMST pattern TABS, and the pattern area variation governed by the remaining sinusoidal term in EQUATION 6 provides the first periodic intensity modulation component. The rate of change of the pattern area variation governed by the term YMIN(x) is greatly exaggerated in FIG. 5, for purposes of illustration. In practice, the dimension RANGE may be several times the wavelength Ltrack (e.g., 20-25 times Ltrack, or more). Signal processing related to deriving two different signals related to the first and second intensity modulation components, respectively, is described in greater detail below with reference to FIG. 6.

The foregoing embodiments illustrates that a variety of DMST patterns may be used to provide absolute track patterns. For example, the '813 discloses an absolute track pattern that is based on a "discrete" sinusoidal area variation in a signal varying pattern portion SP-grid(x), rather than a continuous sinusoidal function as described with reference to the foregoing embodiment. The discrete embodiment of the '813 patent includes a parameter Amin that is analogous to the dimension YMIN(x) outlined above. It should be appreciated that if that parameter Amin is adapted to vary as a function of x (e.g., as Amin(x) in a manner analogous to the dimension YMIN(x), outlined above), that a second long-range intensity modulation component can be provided in a discrete sinusoidal DMST pattern that is otherwise analogous to the discrete sinusoidal absolute track pattern disclosed in the '813 patent. Thus, it will be appreciated that the DMST patterns and absolute track configuration disclosed herein are exemplary only, and not limiting.

FIG. 6 is a diagram illustrating one embodiment of a scale track and detector arrangement 600 comprising two medium wavelength DMST patterns, TABS1X and TABS2X, that may be used with the SCWAM technique, as well as being configured to provide a long-range signal absolute measurement signal that varies linearly over a measurement range. As will be described in more detail below, the absolute scale track patterns TABS1X and TABS2X are formed according to the design principles described above with respect to FIGS. 2-5. In the particular example of the medium wavelength DMST patterns TABS1X and TABS2X, pattern elements similar to those of FIG. 5 are utilized. As described above, in such scale patterns, the medium wavelength signals and the long-range signals are both achieved by varying the width of the opaque "bars" or pattern elements formed on the transparent substrate (e.g., a chrome on glass scale) such that it provides both the first periodic intensity modulation component (that is, the medium wavelength intensity modulation component) and the second long-range intensity modulation component in the spatially modulated light pattern provided by DMST patterns TABS1X and TABS2X.

In the embodiment shown in FIG. 6, the medium wavelength DMST patterns TABS1X and TABS2X furthermore have slightly different wavelengths, L1 and L2, analogous to the medium wavelength DMST patterns previously outlined with reference to FIG. 2. As described previously, and in greater detail below, when the signals are combined from medium wavelength DMST patterns with slightly different wavelengths, the slightly different wavelengths can provide a longer synthetic wavelength (e.g., a beat frequency between the medium wavelengths) from which a relatively coarse resolution synthetic wavelength position can be determined. In one particular embodiment of the pattern elements and dimensions shown in FIG. 6, the synthetic wavelength may be approximately 25.2 mm, and the absolute measuring range of the encoder may be extended to approximately 70 mm or more by the second long-range intensity modulation component in the spatially modulated light pattern provided by DMST patterns. Advantageously, the signal accuracy and resolution provided by the second long-range intensity modulation component need only be accurate to less than about one half of the synthetic wavelength, which allows for robust design margins and operation.

As previously outlined, in the particular example of the medium wavelength DMST patterns TABS1X and TABS2X shown in FIG. 6, pattern elements similar to those of FIG. 5 are utilized. In particular, the medium wavelength DMST patterns TABS1X and TABS2X may each be formed to be described as previously outlined with reference to EQUATIONS 6 and 7. It has been determined that such changes in the pattern element dimensioning component YMIN(x) for encoding the long-range signal may be implemented in certain embodiments without significantly affecting the measurement accuracies associated with the first intensity modulation component which provides position information with a desired accuracy and resolution within a particular medium wavelength of the medium wavelength DMST pattern(s) TABS1X and/or TABS2X.

As shown in FIG. 6, the absolute scale pattern 615 includes the lower medium wavelength DMST pattern TABS1X and the upper medium wavelength DMST pattern TABS2X. For purposes of illustration and explanation, various portions of the absolute scale pattern 615 are also shown in enlarged form, including a left scale pattern segment 615A, a central scale pattern segment 615B and a right scale pattern segment 615C.

The scale pattern portions 615A, 615B, and 615C each include corresponding lower track pattern portions TABS1XA, TABS1XB, and TABS1XC and upper track pattern portions TABS2XA, TABS2XB, and TABS2XC, respectively. The absolute scale pattern 615 is shown to extend over approximately a 70 mm range, with the center being referenced as the 0 position. The central scale pattern segment 615B is thus shown as including the range from −1 mm to +1 mm, while the left scale pattern segment 615A includes the range from −26 mm to −24 mm, and the right scale pattern segment 615C includes the range from +24 mm to +26 mm.

As shown in FIG. 6, the technique of progressively altering the size of the minimum chrome feature and/or minimum clear feature (e.g., the pattern element feature corresponding to the dimension YMIN(x) in FIG. 5) as a function of x along the length of the scale (e.g., according to the function YMIN(x) expressed in EQUATION 7) results in the appearance of a progressive increase in the amount of overall "shading" from either right to left in the DMST pattern TABS2X or left to right in the DMST pattern. More specifically, the DMST pattern TABS1X appears progressively darker from left to right because, for the DMST pattern TABS1X, the dimension YMIN(x) follows a pattern of change corresponding to FIG. 5 and EQUATION 7. Conversely, for the DMST pattern TABS2X, the dimension YMIN(x) follows a pattern of change that is opposite along the measuring axis direction compared to FIG. 5 and EQUATION 7. That is, for the DMST pattern of TABS2X, we may describe a blocking element analogous to that outlined above with reference to FIG. 5 and EQUATION 5 as:

$$YBLOCK(x) = YMIN(xref) * k \frac{RANGE - x}{RANGE} \qquad (Eq. 5')$$

The pattern elements may then be defined by EQUATION 6, where the expression for the dimension YMIN(x) is modified according to EQUATION 5'. That is, for the DMST pattern of TABS2X, in EQUATION 6, YMIN(x) is:

$$YMIN(x) = YMIN(xref) - YBLOCK(x) \qquad (Eq. 7')$$

$$= YMIN(xref) * \left[1 - k\frac{RANGE - x}{RANGE}\right]$$

For purposes of explanation, FIG. 6 shows a set of detector tracks DETABS1X and DETABS2X aligned with the DMST patterns TABS1X and TABS2X, respectively. In one embodiment, the detector tracks DETABS1X and DETABS2X may be understood by analogy with the similar detector tracks DETABS1 and DETABS2 shown in FIG. 2, and the sets of signals (Aabs1, Babs1, Aabs1', and Babs1'), and (Babs2', Aabs2', Babs2, and Aabs2), may be similarly understood by analogy, as well.

The signals and signal processing related to the aforementioned sets of signals is outlined below. It will be understood that the sets of signals (Aabs1, Babs1, Aabs1', and Babs1'), and (Babs2', Aabs2', Babs2, and Aabs2) are substantially similar in many respects, except for overall spatial phase differences between the signals from detector track DETABS1X relative to detector track DETABS2X, due to their detection of different medium wavelengths L1 and L2 of the DMST patterns TABS1X and TABS2X, respectively. In the following discussion, a convention is used wherein the set of signals [A(x), B(x), A'(x), and B'(x)] may correspond to a set of signals from either detector track, that is, either the set of signals [Aabs1, Babs1, Aabs1', and Babs1'] or the set of signals [Aabs2, Babs2, Aabs2', and Babs2']. As will also be described in more detail below, in various embodiments the sum of the set of signals [A(x), B(x), A'(x), and B'(x)] indicates an overall level of signal offset, which includes the effects of the second intensity modulation component and can be utilized for the determination of the long-range absolute measurement signal over the entire measurement range.

Based on the equations and design principles outlined above in relation to FIG. 6, the equations for the four phase signals arising from either one of the DMST patterns TABS1X and TABS2X may be represented as:

$$A(x) = N * \int_{x}^{x+w}\left[YMIN(x) + \left((A) * \sin\left(\frac{2\pi}{Ltrack}(x - xref)\right)\right)\right]dx \qquad (Eq. 8)$$

$$B(x) = \qquad (Eq. 9)$$
$$N * \int_{x+Ltrack/4}^{x+Ltrack/4+w}\left[YMIN(x) + \left((A) * \sin\left(\frac{2\pi}{Ltrack}(x - xref)\right)\right)\right]dx$$

$$A'(x)N * \qquad (Eq. 10)$$
$$\int_{x+Ltrack/2}^{x+Ltrack/2+w}\left[YMIN(x) + \left((A) * \sin\left(\frac{2\pi}{Ltrack}(x - xref)\right)\right)\right]dx$$

$$B'(x) = \qquad (Eq. 11)$$
$$N * \int_{x+3Ltrack/4}^{x+3Ltrack/4+w}\left[YMIN(x) + \left((A) * \sin\left(\frac{2\pi}{Ltrack}(x - xref)\right)\right)\right]dx$$

where N is the integer number of pattern elements spanned by the detector elements along the Y axis direction (e.g., N=3 in the embodiment shown in FIG. 2), w is the width of the detector elements, and YMIN(x) is given by EQUATION 7' for the signals associated with the DMST pattern TABS2X and by EQUATION 7 for the signals associated with the DMST pattern TABS1X. In one particular embodiment, the long-range signal LRS(x), which may indicate the long-range absolute position within the next-finer wavelength (e.g., the synthetic wavelength) over the entire measuring range, may be determined from the sum of these signals (that is, as the net signal offset):

$$LRS(x) = A(x) + B(x) + A'(x) + B'(x) \qquad (Eq. 12)$$

For the particular embodiment outlined above with respect to the EQUATIONS 5-7, 5', and 7', the signal LRS(x) is linear with x because:

$$F(x) = \int_{x}^{x+w} YMIN(x)dx + \int_{x+Ltrack/4}^{x+Ltrack/4+w} YMIN(x)dx + \qquad (Eq. 13)$$
$$\int_{x+Ltrack/2}^{x+Ltrack/2+w} YMIN(x)dx + \int_{x+3Ltrack/4}^{x+3Ltrack/4+w} YMIN(x)dx$$

is linear and also because the sinusoidal parts of A(x) cancel the sinusoidal parts of A'(x) and the sinusoidal parts of B(x) cancel the sinusoidal parts of A'(x):

$$\int_{x}^{x+w} A * \sin\left(\frac{2\pi}{Ltrack}(x - xref)\right)dx + \qquad (Eq. 14)$$
$$\int_{x+Ltrack/2}^{x+Ltrack/2+w} A * \sin\left(\frac{2\pi}{Ltrack}(x - xref)\right)dx = 0$$

$$\int_{x+Ltrack/4}^{x+Ltrack/4+w} A * \sin\left(\frac{2\pi}{Ltrack}(x - xref)\right)dx + \qquad (Eq. 15)$$
$$\int_{x+3Ltrack/4}^{x+3Ltrack/4+w} A * \sin\left(\frac{2\pi}{Ltrack}(x - xref)\right)dx = 0$$

It will be appreciated that in most implementations, the rate of change in signal amplitude due to the rate of change in YMIN(x) may be chosen to be relatively small in comparison to the rate of change due to the sinusoidal signal component (e.g., changing on the order of 4% per wavelength, for example). In such a case, the approximations implied in EQUATIONS 13-15 provide acceptable practical results. However, in any implementations in which the rate of change in signal amplitudes violates these assumptions, additional calculations or techniques can be performed to compensate for the minor additional signal disturbances or crosstalk arising between detection of the first and second intensity modulation components, as may be recognized and corrected by one skilled in the art having the benefit of this disclosure.

In accordance with the above equations, two long-range signals LRS are provided from a configuration such as that illustrated in FIG. 6, wherein a first long-range signal $LRS_1$ is provided from the upper scale track pattern TABS1X and a second long-range signal $LRS_2$ is provided from the lower scale track pattern TABS2X. In embodiments similar to FIG. 6 where the two long-range signals LRS are provided according to EQUATION 12, these two signals have equal and opposite slopes as x varies from a position zero to a position "R" corresponding to the full absolute measuring range (e.g., R approximately equal to Range as shown in EQUATIONS 5, 5', 7, and 7').

$$LRS_1(x) = f_0 + mx$$

$$LRS_2(x) = f_0 + m(R-x) \qquad (Eqs. 16a and 16b)$$

where $f_0$ is the signal offset or bias at one end of the scale, m is the slope of the offset and R is the range of the encoder.

Examples of actual measurements of the long-range signals $LRS_1$ and $LRS_2$ are illustrated in the graph 650 of FIG. 6. As illustrated in the graph 650, the signal $LRS_1$ linearly decreases over the approximately 70 mm range from a value of approximately 4.2 down to a value of approximately 3.3, while the signal $LRS_2$ linearly increases over the approximately 70 mm range from a value of 3.3 up to a value of approximately 4.2.

A long-range position signal $P_{LR}$ can be calculated from the long-range signals $LRS_1$ and $LRS_2$. In some embodiments, it is advantageous for the long-range position signal $P_{LR}$ to vary linearly with the position x and ideally with little or no dependence on $f_0$. One example of such a calculation is:

$$p_{LR}(x) = LRS_1(x) - LRS_2(x) = 2mx - mR \quad \text{(Eq. 17)}$$

where m and R are known by design, calibration, or experiment. As an alternative calculation for the long-range position signal $P_{LR}$ (e.g., in a case where imperfections in the light source or scale pattern fabrication that is used the first and second tracks leads to different values for their respective $f_0$'s), an equation such as the following may be utilized, where it will be understood that the quantity $2f_0$ stands for the more general sum of the respective $f_0$'s associated with the respective scale track patterns:

$$p_{LR}(x) = \frac{LRS_1(x) - LRS_2(x)}{LRS_1(x) + LRS_2(x)} = \frac{2mx - mR}{2f_0 + mR} \quad \text{(Eq. 18)}$$

It will be appreciated that in general, as illustrated by these equations, that the long-range signals $LRS_1$ and $LRS_2$ are both linear in x and can be used in various ways together to generate a long-range position signal $P_{LR}$ that varies approximately linearly with x. In various implementations, a technique of setting a zero reference point or other techniques for performing various compensation measures may also be utilized, as will be known by one skilled in the art. An example of the long-range position signal $P_{LR}$ is illustrated in the graph 670 of FIG. 6, along with an example of a synthetic wavelength spatial phase position signal $P_S$, which is utilized in the chain-down process, as will be described in more detail below. In the foregoing embodiment, the use of two DMST patterns with opposite polarities is advantageous, and may be more robust than using a single signal from a single DMST pattern. However, it should be appreciated that in other embodiments, a single signal from a single DMST pattern (e.g., one of the signals $LRS_1$ or $LRS_2$ shown in 650) may be used. It should also be appreciated that alternatively to basing the long-range signal on a net offset signal variation exhibited by the sum of a plurality signals from the set [A(x), B(x), A'(x), and B'(x)], in some embodiments, a long-range signal may be a varying net amplitude signal determined based on the differences $[A_1(x)-A_1'(x)]$ and $[B_1(x)-B_1'(x)]$ (e.g., a square root of the sum of their squares, for example). In order to provide a significant signal amplitude variation in a long-range signal in some such embodiments, using the nomenclature used with reference to FIGS. 3-5, the dimension A may be varied as a function of x (e.g., A(x)=A(xref)−YBLOCK(x)) in addition to, or instead of, varying the dimension YMIN along a DMST pattern. In any case, once the long-range position signal $P_{LR}(x)$ is determined, the next step is to chain-down to a particular synthetic wavelength position signal $P_S(x)$. In order to chain-down to the synthetic wavelength position signal $P_S(x)$, it is required to know the phases from the first and second scale track patterns (e.g., TABS1X and TABS2X), which may be designated as the $M_1$ and $M_2$ tracks, respectively, for which the corresponding equations may be represented as:

$$\varphi_{M1}(x) = \arctan\left(\frac{A_1(x) - \overline{A_1}(x)}{B_1(x) - \overline{B_1}(x)}\right) \quad \text{(Eqs. 19a and 19b)}$$

$$\varphi_{M2}(x) = \arctan\left(\frac{A_2(x) - \overline{A_2}(x)}{B_2(x) - \overline{B_2}(x)}\right)$$

in which the above subscripts indicate which track pattern the signals come from, for example, $M_1$ may be the medium wavelength absolute track pattern TABS1X outlined above having the wavelength $Ltrack_1$, and $M_2$ may be the medium wavelength absolute track pattern TABS2X outlined above having the wavelength $Ltrack_2$. For convenience in notation, we now define $\lambda_{M1}=Ltrack_1$ and $\lambda_{M2}=Ltrack_2$. The synthetic wavelength position signal $P_S(x)$ is then:

$$p_s(x) = \frac{\lambda_S}{2\pi}(\varphi_{M1}(x) - \varphi_{M2}(x)) \quad \text{(Eqs. 20a and 20b)}$$

$$\lambda_s = \frac{\lambda_{M1}\lambda_{M2}}{\lambda_{M1} - \lambda_{M2}}$$

where $\lambda_S$ is the synthetic wavelength.

As shown in the graph 670, it will be understood that positions where the synthetic wavelength position signal $P_S$ has the same value in various wavelengths indicates the positions where the two tracks (e.g., TABS1X and TABS2X) have the same phase in various synthetic wavelengths. FIG. 6 emphasizes such positions for the example position where the signal value crosses the x-axis. These positions can also be seen in the segments 615A, 615B, and 615C in the upper portion of FIG. 6. In other words, when the pattern elements of the DMST pattern TABS1X exactly line up along the Y axis direction with the pattern elements of the DMST pattern TABS2X, this indicates an area where the two patterns have the same spatial phase. These "in-phase" positions are illustrated as being approximately at the −25, 0, and +25 positions, and will result in the substantially the same phase signals (e.g., according to EQUATIONS 19a and 19b) from their corresponding detector tracks, such that $P_S(x) \approx 0$ (e.g., according to EQUATION 20a) at those positions.

It is clear from 670 that the 2 or 3 particular wavelength instances of identical signal values $P_S(x)$ (that is, spatial phase positions within a synthetic wavelength) may be readily distinguished from one another by the corresponding unique values of the signal $P_{LR}(x)$. Thus, once the coarsest resolution long-range position signal $P_{LR}(x)$ is established, then the synthetic wavelength position signal $P_S(x)$ within a particular wavelength may be added to the known wavelength "reference" position corresponding the particular synthetic wavelength indicated by long-range position signal $P_{LR}(x)$, to provide an absolute position measurement having a better resolution associated with the synthetic wavelength. Similarly, particular wavelength instances of identical signal values $P_{M1}(x)$ or $P_{M2}(x)$, indicated by EQUATIONS 21a and 21b, below (that is, spatial phase positions within a medium absolute wavelength), may be readily distinguished from one another by the corresponding unique values of the signal synthetic wavelength position signal $P_S(x)$. Thus, once the synthetic wavelength position signal $P_S(x)$ is established, then the medium absolute wavelength signal $P_{M1}(x)$ or $P_{M2}(x)$ within a particular medium wavelength may be added to the known wavelength "reference" position corresponding the particular medium wavelength indicated by synthetic wavelength position signal $P_S(x)$ to provide an absolute position measurement having a better resolution associated with the medium wavelength. The medium absolute wavelength signal $P_{M1}(x)$ or $P_{M2}(x)$ may be indicated as:

$$p_{M1}(x) = \frac{\lambda_{M1}}{2\pi}\varphi_{M1}(x)$$

$$p_{M2}(x) = \frac{\lambda_{M2}}{2\pi}\varphi_{M2}(x)$$

(Eqs. 21a and 21b)

In this manner, the chain-down process can be used to link the long-range, synthetic, medium and incremental phases together to determine the absolute position to high resolution. By providing one or more dual-modulation scale track patterns that encode or superimpose a second long range intensity modulation component onto a first shorter-range intensity modulation component, the DMST pattern configurations disclosed herein allow the absolute measuring range and or the range-to-resolution ratio of an encoder to be increased without increasing the width of its scale or detector or other encoder components. Thus, an encoder system is provided with an improved range-to-resolution ratio, in an economical and compact manner usable with a variety of different scale track pattern and detector arrangements.

It will be appreciated that although the foregoing embodiments have encoded or superimposed the second long-range intensity modulation component onto the first shorter-range intensity modulation component by means of area variations of the basic pattern elements (e.g., in the variation provided by YMIN(x)), that, instead, a variable density filter layer or the like may be layered onto a pattern element that exhibits only the sinusoidal pattern area variation component, and not the YMIN(x) pattern area variation component. In other words, a superimposed layer that provides an optical density variation along the measuring axis direction may provide the second intensity modulation component in various embodiments.

It will be appreciated that in certain implementations, the synthetic wavelength position signal $P_S(x)$ may not be required for the chain-down process, if the desired range and design margins can be achieved without it. In such a circumstance, the long-range position signal $P_{LR}$ may be able to be interpolated to a degree that accurately and reliably indicates a particular one of the medium pattern wavelengths (e.g., in the specific example of FIG. 6, this would require a linear signal that could be accurately interpolated to a desired level to accurately chain down to one of the signals from the medium scale track patterns TABS1X or TABS2X, etc.).

Figure 7:
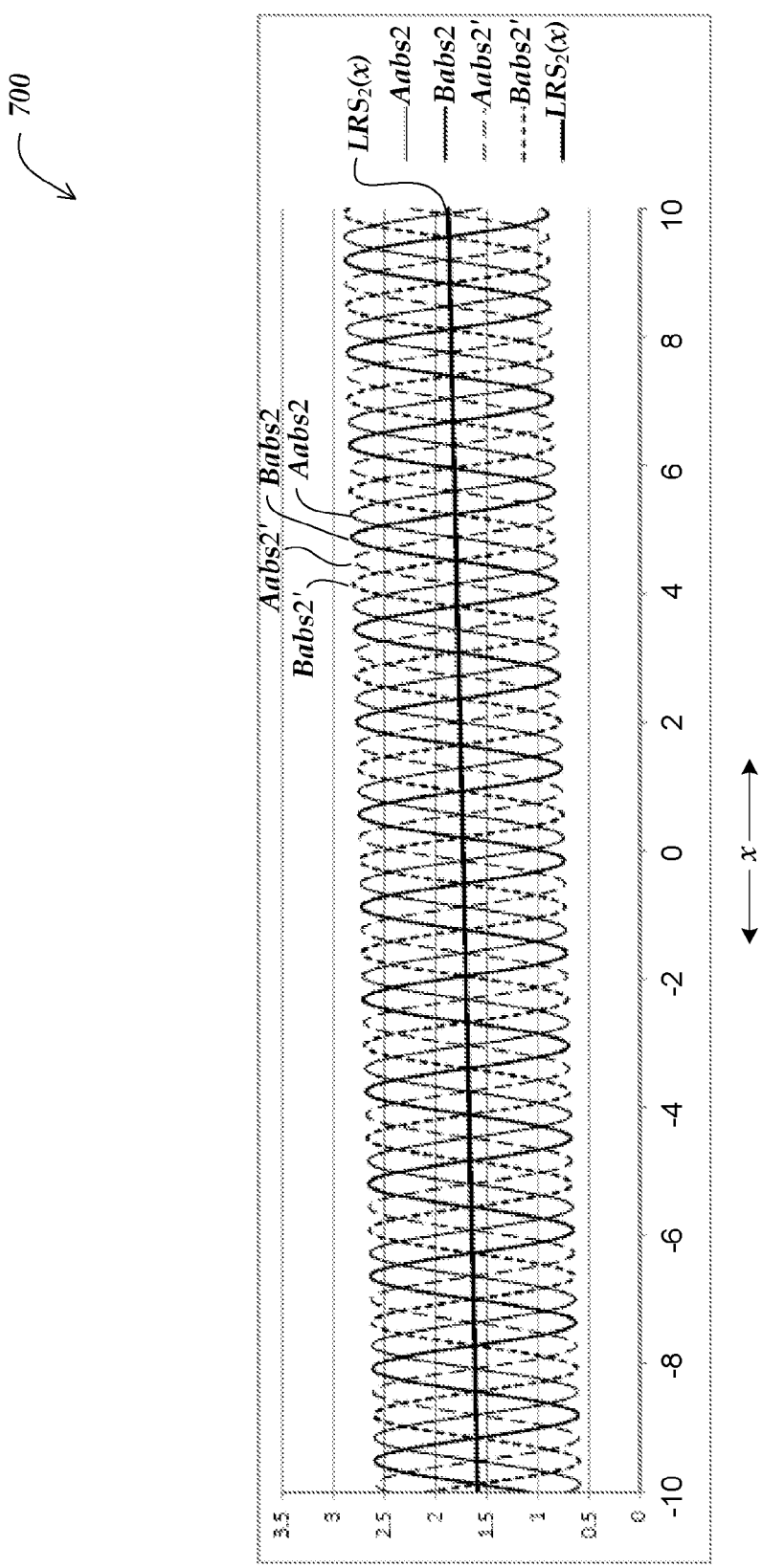
FIG. 7 is a diagram of a set of output signals of the scale track and detector arrangement of FIG. 6.

FIG. 7 is a diagram 700 of signals produced by the scale track and detector track DETABS2X of FIG. 6. As described above, as the detector track DETABS2X and the individual detector elements A2, B2, A2', and B2' move over the upper track pattern TABS2X, the signals Aabs2, Babs2, Aabs2', and Babs2' (as output from the detector elements A2, B2, A2', and B2', respectively), oscillate according to position. As the detector track DETABS2X is moved over the range from approximately −10 mm to +10 mm, the overall long-range signal $LRS_2$ (i.e., the offset) increases by approximately 0.25 volts (which corresponds to the same amount of increase over a similar range illustrated in FIG. 6).

As described above with respect to FIGS. 6 and 7, the long-range signals $LRS_1$ and $LRS_2$ vary linearly in accordance with the progressive long-range pattern variation in the scale track patterns TABS1X and TABS2X. This linear variation in the long-range signals $LRS_1$ and $LRS_2$ allows the proper wavelength of the synthetic wavelength position signal $P_S$ to be determined, such that the chain-down process may be performed to a desired level of accuracy for the desired length of the scale. As will be described in more detail below with respect to FIGS. 8 and 9, in alternative embodiments, rather than linearly varying the long-range signals $LRS_1$ and $LRS_2$, different types of long range pattern variation may also be utilized. For example, in various embodiments, the long-range signal (e.g., the offset level) may be varied according to a step function (e.g., as described in more detail below with respect to FIG. 8), or other nonlinear function (e.g., as will be described in more detail below with respect to FIG. 9).

Figure 8:
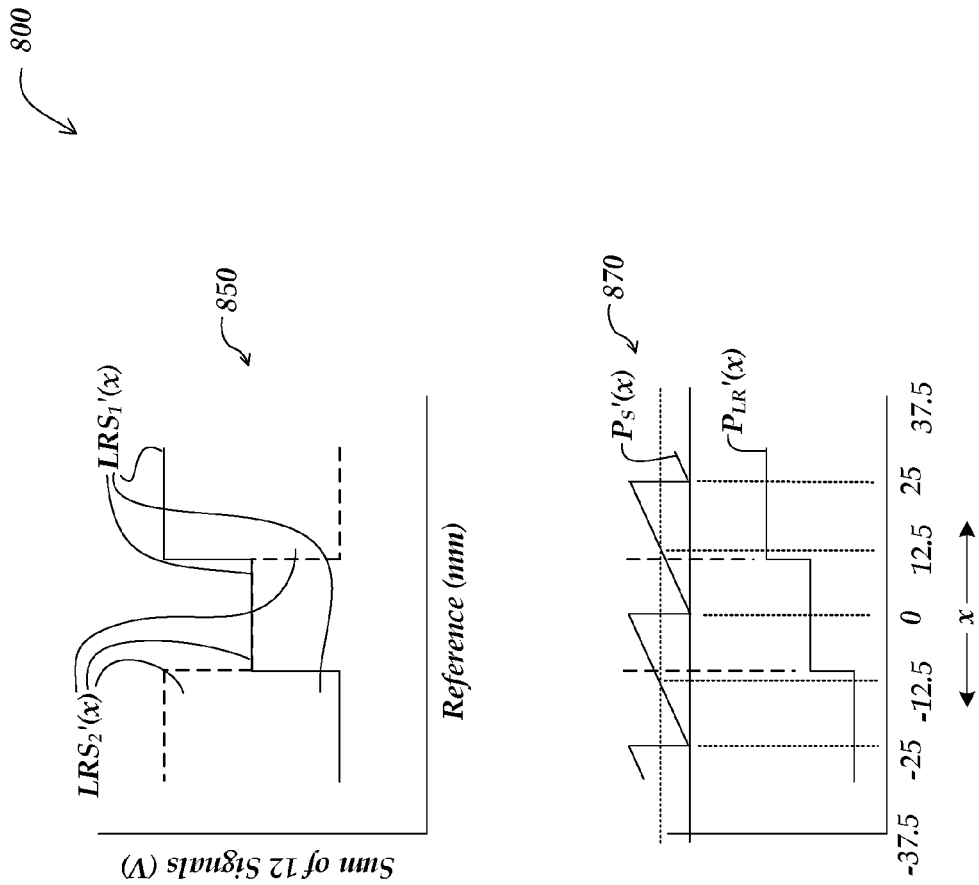
FIG. 8 is a diagram of a set of output signals of an embodiment of a scale track and detector arrangement in which the absolute scale track patterns are configured to provide long-range intensity modulation components that produce a step-function long-range signal in accordance with this invention.

FIG. 8 is a diagram 800 illustrating output signals in an embodiment of a scale track and detector arrangement in which the absolute scale track patterns are configured to provide long-range intensity modulation components that produce a step-function long-range signal in accordance with the present invention. As shown in FIG. 8, a graph 850 illustrates long-range signals $LRS_1'$ and $LRS_2'$, and a graph 870 illustrates a synthetic wavelength position signal $P_S'$ and a long-range position signal $P_{LR}'$. As shown in the graph 850, the long-range signals $LRS_1'$ and $LRS_2'$ follow a type of step function, with three different signal levels across the length of the scale. As shown in the graph 870, because the synthetic wavelength position signal $P_S'$ only repeats a limited number of times (e.g., approximately 2.5 times in the example of FIG. 8), with proper construction and signal processing, the three different levels of the long-range signals $LRS_1'$ and $LRS_2'$ are sufficient to indicate the proper synthetic wavelength so that the chain-down process may be performed with a desired level of accuracy. In other words, as long as the number of steps (e.g., three) in the long-range signals $LRS_1'$ and $LRS_2'$ can be used to unambiguously identify the appropriate synthetic wavelength, then the desired absolute measurement operation and level of accuracy for the chain-down process may be accomplished. In the example of FIG. 8, while the synthetic wavelength position signal $P_S'$ is approximately the same at various positions, the steps of the long-range position signal $P_{LR}'$ each have a different signal value at those positions, so they adequately resolve the ambiguity in the synthetic wavelength.

It will be appreciated that in the embodiment of FIG. 8, the number of steps in the long-range signals $LRS_1'$ and $LRS_2'$, and particularly in the corresponding long-range position signal $P_{LR}'$ (e.g., $P_{LR}'=LRS_1'-LRS_2'$), may be varied in various embodiments depending on the length of the synthetic wavelength position signal $P_S'$ and how many times it repeats. In general, the number of wavelengths used for each synthetic wavelength position signal $P_S'$ and the variations in each long-range position signal $P_{LR}'$ are balanced based on the ability to interpolate each so as to provide the most advantageous range and robust signal margins. In certain implementations, the synthetic wavelength position signal $P_S'$ may not even be required, if the desired range can be achieved without it. In such a circumstance, the long-range position signal would need to be able to be indicated and/or interpolated to a degree that would accurately indicate one of the medium pattern wavelengths. In the specific example of FIG. 8, this would most likely require a significant number of steps in the long-range position signal $P_{LR}'$.

In one specific example implementation of an encoder system for producing the output signals of FIG. 8, a scale track pattern for producing the long-range signals $LRS_1'$ and $LRS_2'$ may be formed by applying different thicknesses of mostly transparent chrome layers to a scale in three sections before applying the scale track pattern. It will be appreciated that other methods of providing the desired step function in accordance with other possible distinguishing characteristics for the scale track patterns may also be utilized.

It will also be appreciated that in certain implementations the encoder system of FIG. 8 may require certain processing techniques that can accommodate abrupt shifts from one section of the scale to another. Such abrupt shifts require techniques to ensure that the encoder is robust to having detectors that straddle two different sections while still providing output signals that can be accurately processed to determine the correct position. In addition, offset and amplitude variations, which would be present when the detectors straddle between two sections, may cause additional short-range errors in the system for which it may be desirable to perform additional compensation, as will be known by one skilled in the art.

Figure 9:
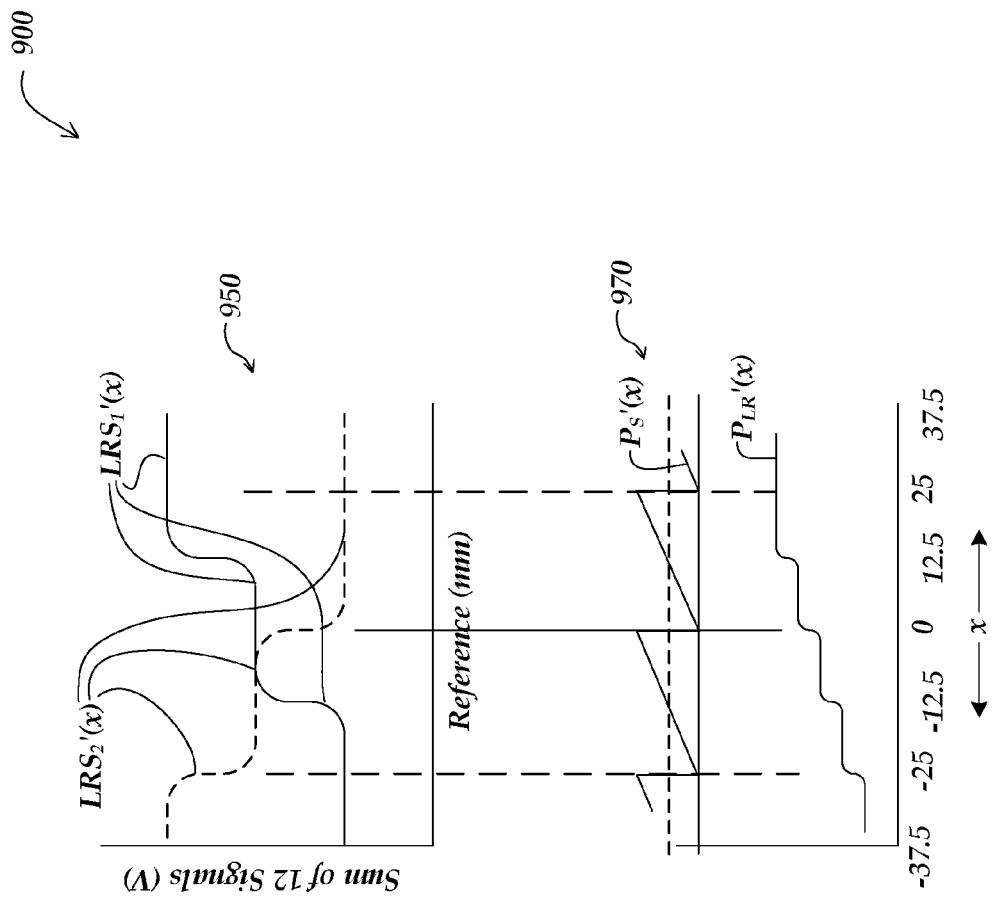
FIG. 9 is a diagram of a set of output signals of an embodiment of a scale track and detector arrangement in which the absolute scale track patterns are configured to provide long-range intensity modulation components that produce another embodiment of a nonlinear long-range signal in accordance with this invention.

FIG. 9 is a diagram 900 illustrating output signals in an embodiment of a scale track and detector arrangement in which the absolute scale track patterns are configured to provide long-range intensity modulation components that produce a step-function long-range signal analogous to that shown in FIG. 8, except the signal shown in FIG. 9 includes a higher rate of step change in comparison to the signal shown in FIG. 8. As shown in FIG. 9, a graph 950 illustrates long-range signals $LRS_1'$ and $LRS_2'$, and a graph 970 illustrates a synthetic wavelength position signal $P_S'$ and a long-range position signal $P_{LR}'$. As shown in the graph 950, the long-range signals $LRS_1'$ and $LRS_2'$ each follow a type of step function, with three different signal levels across the length of the scale, but in contrast to the analogous signals shown in FIG. 8, the signals $LRS_1'$ and $LRS_2'$ are not simple inversions of one another. Rather, their steps are staggered relative to one another along the measuring axis direction to provide a larger number of discrete signal level steps (e.g., five signal level steps in the example shown in FIG. 9). As shown in the graph 970, because the synthetic wavelength position signal $P_S'$ only repeats a limited number of times (e.g., approximately 2.5 times in the example of FIG. 9), the 5 different signal levels of long-range position signal $P_{LR}'$ (e.g., $P_{LR}'=LRS_1'-LRS_2'$) provided by the long-range signals $LRS_1'$ and $LRS_2'$ robustly indicate the proper synthetic wavelength, such that the desired absolute measurement operation and level of accuracy for the chain-down process may be accomplished. For example, in FIG. 9, while the synthetic wavelength position signal $P_S'$ is approximately the same at a number of positions, the steps of $P_{LR}'$ each have a different signal value at those positions, so they adequately resolve the ambiguity in the synthetic wavelength.

It will be appreciated that the embodiment shown in FIG. 9 illustrates that the number of steps in the long-range signals $LRS_1'$ and $LRS_2'$, and particularly in the corresponding long-range position signal $P_{LR}'$ (e.g., $P_{LR}'=LRS_1'-LRS_2'$), may be further varied depending on the length of the synthetic wavelength position signal $P_S'$ and how many times it repeats. In general, the number of wavelengths used for each synthetic wavelength position signal $P_S'$ and the type of variation provided in the long-range position signal $P_{LR}'$ are balanced based on the ability to interpolate each so as to provide the most advantageous range and robust signal margins. More generally, as will be understood based on this disclosure, the long-range signals $LRS_1'$ and $LRS_2'$ or the like, and the corresponding long-range position signal $P_{LR}'$ or the like, may be configured to provide any desirable number of steps or continuous nonlinear signal variations (e.g., sine wave type variations, or segments thereof, or any other desirable nonlinear signal variation).

The signal processing that provides the long-range position signal ($P_{LR}$) may take any convenient form, and is not limited to simple differential signal processing in various embodiments. As one example, such signal processing may include normalization for illumination intensity, or the like. As another example, absolute scale track patterns may be configured such that the long-range signals ($LRS_1$ and $LRS_2$) provide quadrature signals (that is, sine and cosine signals with a wavelength somewhat longer than the measuring range), which may be processed according to know methods to provide a long-range position signal ($P_{LR}$). In such an embodiment, it may be desirable to make the offsets for the quadrature signals approximately the same, or else measure and/or eliminate the offsets using appropriate signal processing, such that the signal-to-noise ratio of the long-range position signal ($P_{LR}$) is improved. In one such embodiment, the derivative (i.e., the slope) of the quadrature signals may be determined by processing, instead of using the signals themselves. The derivatives of such sinusoidal signals are themselves sinusoids but with no offsets. An important consideration in such an implementation is the level of noise which, if the noise becomes too high, it may become dominant and render the derivative signals relatively less useful, in which case alternative implementations may be preferred.

It will be appreciated that in certain implementations, the synthetic wavelength position signal $P_S'$ may not even be required, if the desired range can be achieved without it. In such a circumstance, the long-range position signal would need to be able to be indicated and/or interpolated to a degree that would accurately indicate one of the medium pattern wavelengths.

It will be appreciated that relative to the abrupt step pattern technique of FIG. 8, the smoothed step transition technique of FIG. 9 provides a smoother variation, in which there are no abrupt shifts. In certain implementations, it is generally desirable for the shifts to be gradual enough so as to not induce significant errors in the medium wavelength signals.

In one specific example implementation of an encoder system for producing the output signals of FIG. 9, a scale track pattern for producing the long-range signals $LRS_1'$ and $LRS_2'$ may be formed by applying different thicknesses of mostly transparent chrome layers to a scale before applying the scale track pattern. It will be appreciated that other methods of providing the desired step function in accordance with other possible distinguishing characteristics for the scale track patterns may also be utilized.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. An absolute optical encoder comprising:
   a scale comprising at least a first dual-modulation scale track pattern extending along a measuring axis direction;
   a light source configured to illuminate the scale and the first dual-modulation scale track pattern; and
   a photo detector arrangement comprising a first detector track configured to receive light from the first dual-modulation scale track pattern;
   wherein the first dual-modulation scale track pattern is configured to provide a first intensity modulation component in light the first detector track receives from the first dual-modulation scale track pattern, and the first intensity modulation component of the first dual-modulation scale track pattern varies as a function of position along the measuring axis direction, and has a first spatial wavelength SW1 along the measuring axis direction;

wherein the first dual-modulation scale track pattern is further configured to provide a second intensity modulation component in the light the first detector track receives from the first dual-modulation scale track pattern, and the second intensity modulation component varies as a function of position along the measuring axis direction;

wherein in the first dual-modulation scale track pattern the first intensity modulation component repeats along the measuring axis direction a plurality of times over a measuring range of the absolute optical encoder, and the second intensity modulation component varies at a slower rate than the first intensity modulation component along the measuring axis direction;

wherein the first detector track comprises a first array of detector elements arranged along the measuring axis direction;

wherein each detector element in the first array is configured to receive both the first and second intensity modulation components;

wherein the detector elements in the first array are configured to form a plurality of respective spatial phase groups, each respective spatial phase group configured to spatially filter the light received from the first dual-modulation scale track pattern and provide a respective signal having a respective spatial phase relative to the first spatial wavelength SW1 of the first intensity modulation component of the first dual-modulation scale track pattern; and wherein the respective signals of the respective spatial phase groups include the effects of the second intensity modulation component, such that a signal processing relationship combining respective signals of the respective spatial phase groups provides a value that is indicative of a first coarse resolution position of the first detector track relative to the second intensity modulation component of the first dual-modulation scale track pattern.

2. The absolute optical encoder of claim 1, wherein the detector elements in the first array comprise a first set of photo detector elements configured to receive light from the first dual-modulation scale track pattern, and the first set of photo detector elements are connected such that a set of signals from the first set of photo detector elements processed according to a first relationship provides a value that is indicative of a first track position of the first set of photo detector elements relative to a period of the first spatial wavelength SW1 of the first intensity modulation component of the first dual-modulation scale track pattern, and the set of signals from the first set of photo detector elements processed according to a second relationship provides a value that is indicative of a first coarse resolution position of the first set of photo detector elements relative to the second intensity modulation component of the first dual-modulation scale track pattern.

3. The absolute optical encoder of claim 2, wherein:
the set of signals from the first set of photo detector elements comprises a plurality of the respective signals $A_1(x)$, $B_1(x)$, $A_1'(x)$, and $B_1'(x)$ that vary as a function of position x along the measuring axis direction, wherein a nominal phase difference between $A_1(x)$ and $B_1(x)$ is 90 degrees, a nominal phase difference between $A_1(x)$ and $A_1'(x)$ is 180 degrees, and a nominal phase difference between $A_1(x)$ and $B_1'(x)$ is 270 degrees; and
the set of signals from the first set of photo detector elements processed according to the second relationship provides a value that comprises one of an offset value $OFFSET1(x)$ that is based on at least one of the sums $[A_1(x)+A_1'(x)]$ and $[B_1(x)+B_1'(x)]$, and an amplitude value $AMP1(x)$ that is based on the differences $[A_1(x)-A_1'(x)]$ and $[B_1(x)-B_1'(x)]$.

4. The absolute optical encoder of claim 3, wherein:
the offset value $OFFSET1(x)$ is based on a relationship comprising the quantity $[A_1(x)+A_1'(x)+B_1(x)+B_1'(x)]$, and the amplitude value $AMP1(x)$ is based on a relationship comprising the quantity $([A_1(x)-A_1'(x)]^2+[B_1(x)-B_1'(x)]^2)^{1/2}$.

5. The absolute optical encoder of claim 2, wherein an edge-to-edge dimension of the first set of photo detector elements is less than an edge-to-edge dimension of the first dual-modulation scale track pattern, and the first dual-modulation scale track pattern and the first set of photo detector elements are configured such that the set of signals from the first set of photo detector elements processed according to the second relationship provides a value that is nominally insensitive to the position of the first set of photo detector elements within the first dual-modulation scale track pattern, along a direction perpendicular to the measuring axis direction.

6. The absolute optical encoder of claim 5, wherein the first dual-modulation scale track pattern and the first set of photo detector elements are configured such that the set of signals from the first set of photo detector elements processed according to the first relationship provides a value that is nominally insensitive to the position of the first set of photo detector elements within the first dual-modulation scale track pattern, along a direction perpendicular to the measuring axis direction.

7. The absolute optical encoder of claim 1, wherein the first intensity modulation component is provided by area variations included in pattern elements included in the first dual-modulation scale track pattern.

8. The absolute optical encoder of claim 7, wherein the first and second intensity modulation components are provided by area variations included in pattern elements included in the first dual-modulation scale track pattern.

9. The absolute optical encoder of claim 7, wherein the first dual-modulation scale track pattern comprises a superimposed layer that is configured to provide an optical density variation along the measuring axis direction, wherein the superimposed layer is not used to form the pattern elements and the optical density variation provides the second intensity modulation component.

10. The absolute optical encoder of claim 9, wherein the optical density of the superimposed layer is substantially uniform along a direction perpendicular to the measuring axis direction.

11. The absolute optical encoder of claim 1, wherein the second intensity modulation component varies to provide at least 3 different intensity levels distributed along the measuring axis direction over an absolute measuring range, and each different intensity level is present in a total of at most one-third of the measuring range.

12. The absolute optical encoder of claim 11, wherein the second intensity modulation component varies to provide a variation that provides a unique intensity level at each position over the absolute measuring range.

13. The absolute optical encoder of claim 11, wherein the variation that provides a unique intensity level at each position comprises one of a linear variation and a nonlinear variation.

14. The absolute optical encoder of claim 1, including a second dual-modulation scale track pattern extending along the measuring axis direction, the light source configured to illuminate the second dual-modulation scale track pattern, and the photo detector arrangement comprising a second detector track configured to receive light from the second dual-modulation scale track pattern;
- wherein the second dual-modulation scale track pattern is configured to provide a first intensity modulation component in light the second detector track receives from the second dual-modulation scale track pattern, and the first intensity modulation component of the second dual-modulation scale track pattern varies as a function of position along the measuring axis direction, and has a second spatial wavelength SW2 along the measuring axis direction;
- wherein the second dual-modulation scale track pattern is further configured to provide a second intensity modulation component in the light the second detector track receives from the second dual-modulation scale track pattern, and the second intensity modulation component varies as a function of position along the measuring axis direction;
- wherein in the second dual-modulation scale track pattern the first intensity modulation component repeats along the measuring axis direction a plurality of times over a measuring range of the absolute optical encoder, and its second intensity modulation component varies at a slower rate than its first intensity modulation component along the measuring axis direction;
- wherein the second detector track comprises a second array of detector elements arranged along the measuring axis direction;
- wherein each detector element in the second array is configured to receive both the first and second intensity modulation components provided by the second dual-modulation scale track pattern;
- wherein the detector elements in the second array are configured to form a plurality of respective spatial phase groups, each respective spatial phase group configured to spatially filter the light received from the second dual-modulation scale track pattern and provide a respective signal having a respective spatial phase relative to the second spatial wavelength SW2 of the second intensity modulation component of the second dual-modulation scale track pattern;
- wherein the respective signals of the respective spatial phase groups include the effects of the second intensity modulation component, such that a signal processing relationship combining respective signals of the respective spatial phase groups provides a value that is indicative of a second coarse resolution position of the second detector track relative to the second intensity modulation component of the second dual-modulation scale track pattern; and
- wherein the first and second dual-modulation scale track patterns are configured such that a difference between their respective second intensity modulation components provides at least 3 different intensity-difference signal levels distributed along the measuring axis direction over an absolute measuring range, and each different intensity-difference signal level is present in a total of at most one-third of the measuring range.

15. The absolute optical encoder of claim 14, wherein the absolute value of the quantity $(SW1*SW2)/(SW1-SW2)$ defines a synthetic wavelength that is at most one-third of the absolute measuring range.

16. The absolute optical encoder of claim 15, wherein the detector comprises elements in the first array comprise a first set of photo detector elements configured to receive light from the first dual-modulation scale track pattern, and the first set of photo detector elements are connected such that a set of signals from the first set of photo detector elements processed according to a first relationship provides a value that is indicative of a first track position of the first set of photo detector elements relative to a period of the first spatial wavelength SW1 of the first intensity modulation component of the first dual-modulation scale track pattern;
- wherein the detector elements in the second array comprise a second set of photo detector elements configured to receive light from the second dual-modulation scale track pattern, and the second set of photo detector elements are connected such that a set of signals from the second set of photo detector elements processed according to a second relationship provides a value that is indicative of a second track position of the second set of photo detector elements relative to a period of the second spatial wavelength SW2 of the first intensity modulation component of the second dual-modulation scale track pattern; and
- wherein the set of signals from the second set of photo detector elements processed according to a relationship with the set of signals from the first set of photo detector elements provides a value that is indicative of a first coarse resolution position of the first and second sets of photo detector elements relative to the first and second dual-modulation scale track patterns within a period of the synthetic wavelength.

17. The absolute optical encoder of claim 14, wherein the first and second dual-modulation scale track patterns are configured such that a difference between their respective second intensity modulation components has a variation along the measuring axis direction that provides a unique intensity-difference signal level at each position over the absolute measuring range.

18. The absolute optical encoder of claim 17, wherein the variation along the measuring axis direction that provides a unique intensity-difference signal level at each position over the absolute measuring range comprises one of a linear variation and a nonlinear variation.

* * * * *